(12) United States Patent
Landry

(10) Patent No.: US 9,454,341 B2
(45) Date of Patent: Sep. 27, 2016

(54) DIGITAL IMAGE DISPLAY DEVICE WITH AUTOMATICALLY ADJUSTED IMAGE DISPLAY DURATIONS

(75) Inventor: Lawrence B. Landry, Victor, NY (US)

(73) Assignee: Kodak Alaris Inc., Rochester, NY (US)

( * ) Notice: Subject to any disclaimer, the term of this patent is extended or adjusted under 35 U.S.C. 154(b) by 297 days.

(21) Appl. No.: 12/949,029

(22) Filed: Nov. 18, 2010

(65) Prior Publication Data

US 2012/0127196 A1    May 24, 2012

(51) Int. Cl.
*G09G 5/30* (2006.01)
*G06F 3/147* (2006.01)

(52) U.S. Cl.
CPC ........... *G06F 3/147* (2013.01); *G09G 2380/02* (2013.01); *G09G 2380/16* (2013.01)

(58) Field of Classification Search
CPC ...................................................... G09G 5/393
USPC ......................................................... 345/619
See application file for complete search history.

(56) References Cited

U.S. PATENT DOCUMENTS

| 4,754,271 | A | 6/1988 | Edwards | |
|---|---|---|---|---|
| 6,426,705 | B1 * | 7/2002 | Wischoeffer | 340/12.27 |
| 6,509,910 | B1 | 1/2003 | Agarwal et al. | |
| 6,937,997 | B1 | 8/2005 | Parulski | |
| 7,143,010 | B2 * | 11/2006 | Sprogis et al. | 702/188 |
| 7,155,679 | B2 * | 12/2006 | Bandaru et al. | 715/748 |
| 7,307,636 | B2 | 12/2007 | Matraszek et al. | |
| 7,636,733 | B1 * | 12/2009 | Rothmuller | 382/305 |
| 7,663,784 | B2 * | 2/2010 | Silverbrook | 358/302 |
| 7,742,950 | B2 * | 6/2010 | Wolinsky et al. | 705/27.1 |
| 7,792,708 | B2 * | 9/2010 | Alva | 705/26.1 |
| 7,827,139 | B2 * | 11/2010 | Schauser et al. | 707/613 |
| 7,912,759 | B2 * | 3/2011 | Wolinsky et al. | 705/14.73 |
| 8,134,539 | B2 * | 3/2012 | Parada et al. | 345/173 |
| 8,139,751 | B1 * | 3/2012 | Magsamen et al. | 379/265.01 |
| 8,195,768 | B2 * | 6/2012 | Vaughan et al. | 709/219 |
| 8,224,390 | B2 * | 7/2012 | Alberth et al. | 455/566 |
| 8,279,344 | B2 * | 10/2012 | Boak | 348/513 |
| 8,291,456 | B2 * | 10/2012 | Emoto et al. | 725/75 |
| 8,315,913 | B2 * | 11/2012 | Wolinsky et al. | 705/26.1 |

(Continued)

FOREIGN PATENT DOCUMENTS

| EP | 2259218 A1 * | 12/2010 |
|---|---|---|
| EP | 2 259 218 | 12/2012 |

OTHER PUBLICATIONS

Hp digital Photo Frame User Guide, 2007.*

(Continued)

*Primary Examiner* — Javid A Amini
(74) *Attorney, Agent, or Firm* — Hogan Lovells US LLP

(57) ABSTRACT

A digital image display device for displaying a collection of digital images, comprising: a display screen; a processor; a real-time clock; an image memory for storing a plurality of digital images; and a processor-accessible program memory. The program memory stores executable instructions for causing the processor to execute the steps of: initiating a sequential display of a sequence of digital images on the display screen at an initial time, the sequence of digital images including at least a subset of the stored digital images, each digital image being displayed for an image display duration, the image display duration being set to an initial image display duration at the initial time; and modifying the image display duration during the display of the sequence of digital images.

18 Claims, 11 Drawing Sheets

(56) References Cited

U.S. PATENT DOCUMENTS

| | | | |
|---|---|---|---|
| 2002/0144162 A1* | 10/2002 | Tada et al. | 713/300 |
| 2003/0052897 A1* | 3/2003 | Lin | 345/619 |
| 2003/0220830 A1* | 11/2003 | Myr | 705/10 |
| 2004/0126038 A1* | 7/2004 | Aublant et al. | 382/305 |
| 2004/0205479 A1* | 10/2004 | Seaman et al. | 715/500.1 |
| 2006/0004632 A1* | 1/2006 | Kelsen et al. | 705/14 |
| 2006/0173746 A1* | 8/2006 | Cooper et al. | 705/26 |
| 2007/0160152 A1* | 7/2007 | Yoshimoto | 375/240.26 |
| 2008/0100596 A1* | 5/2008 | Peng | 345/204 |
| 2008/0155478 A1* | 6/2008 | Stross | 715/849 |
| 2008/0195962 A1* | 8/2008 | Lin et al. | 715/771 |
| 2009/0099919 A1* | 4/2009 | Schultheiss et al. | 705/14 |
| 2009/0113307 A1* | 4/2009 | MacKenzie | 715/732 |
| 2009/0141800 A1* | 6/2009 | Larson | 375/240.12 |
| 2010/0031132 A1* | 2/2010 | Yamaji et al. | 715/203 |
| 2010/0039531 A1* | 2/2010 | Choi et al. | 348/231.99 |
| 2010/0118200 A1* | 5/2010 | Gelman et al. | 348/578 |
| 2010/0166390 A1* | 7/2010 | Fukuya et al. | 386/95 |
| 2010/0174993 A1* | 7/2010 | Pennington et al. | 715/738 |
| 2011/0040754 A1* | 2/2011 | Peto et al. | 707/736 |
| 2011/0157420 A1* | 6/2011 | Bos et al. | 348/231.2 |
| 2011/0282727 A1* | 11/2011 | Phan et al. | 705/14.36 |
| 2012/0059855 A1* | 3/2012 | Dey et al. | 707/792 |
| 2012/0130845 A1* | 5/2012 | Telek et al. | 705/26.5 |
| 2012/0131359 A1* | 5/2012 | Landry et al. | 713/310 |
| 2012/0131465 A1* | 5/2012 | Telek et al. | 715/733 |
| 2012/0167047 A1* | 6/2012 | Wyler et al. | 717/122 |
| 2012/0189275 A1* | 7/2012 | Hamada et al. | 386/244 |
| 2013/0061265 A1* | 3/2013 | Recco | 725/40 |
| 2013/0339898 A1* | 12/2013 | Jung | 715/781 |

OTHER PUBLICATIONS

U.S. Appl. No. 12/911,959, filed Oct. 26, 2010, Krolczyk et al.
U.S. Appl. No. 12/946,055, filed Nov. 15, 2010, Landry et al.
Thinking Screen Media, FrameChannel, http://www.thinkingscreen.com/framechannel.html (archived Sep. 14, 2010 at http://web.archive.org/web/20100914220316/http://www.thinkingscreen.com/framechannel.html).
Thinking Screen Media, Partners, http://www.thinkingscreen.com/partners.html (archived Sep. 1, 2010 at https://web.archive.org/web/20100901234942/http://www.thinkingscreen.com/partners.html).
Chumby, http:/lwww.chumby.com (archived Sep. 20, 2010 at https://web.archive.org/web/20100920180927/htip://www.chumby.com).

* cited by examiner

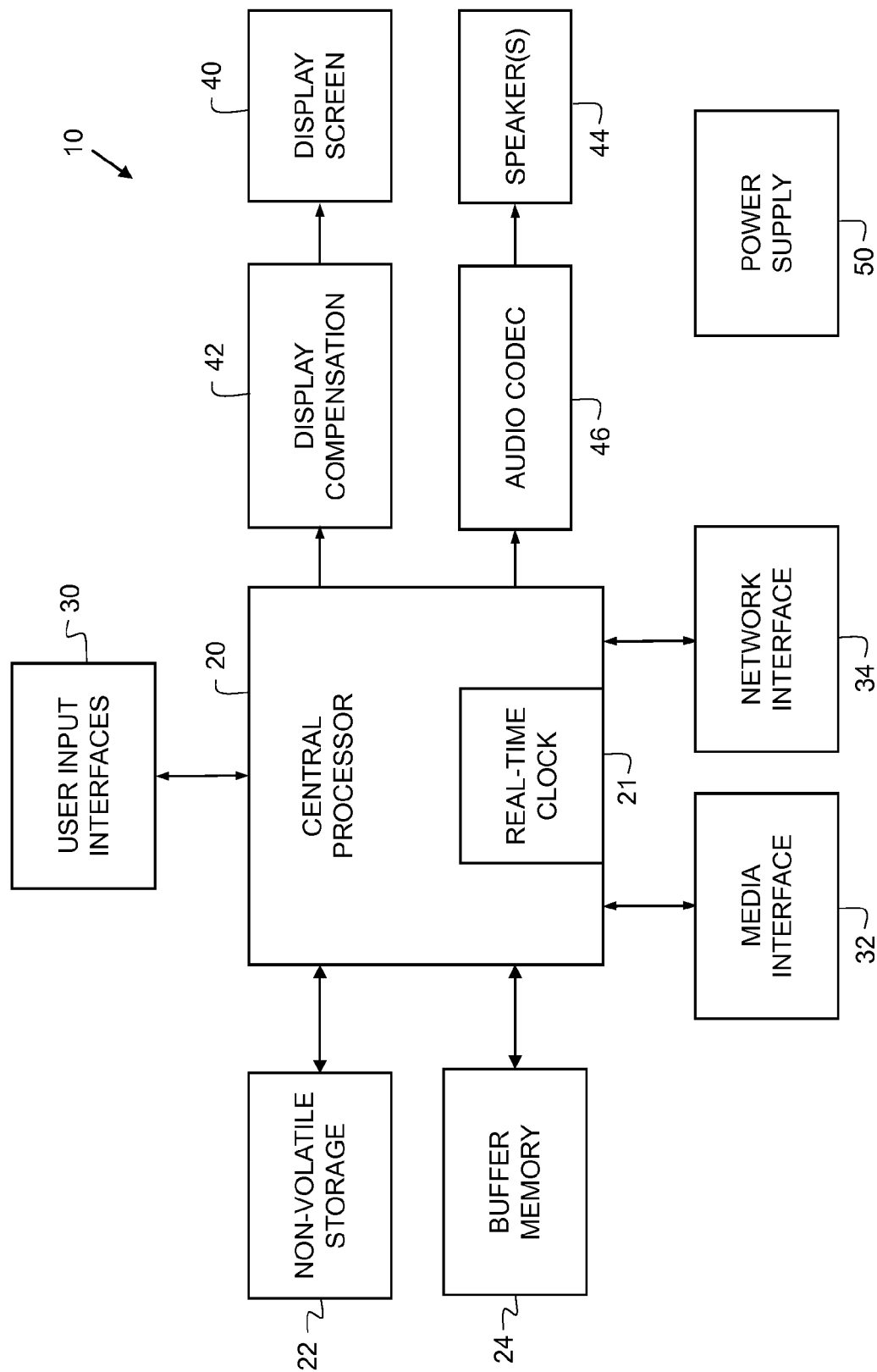

DIGITAL IMAGE DISPLAY DEVICE WITH AUTOMATICALLY ADJUSTED IMAGE DISPLAY DURATIONS

CROSS REFERENCE TO RELATED APPLICATIONS

Reference is made to commonly assigned, co-pending U.S. patent application Ser. No. 12/948,994, entitled: "Digital Image Display Device With Reduced Power Mode", by Lawrence Landry; to commonly assigned, co-pending U.S. patent application Ser. No. 12/949,054, entitled: "Digital Image Display Device With Remotely Disableable User Interface", by Michael Telek; to commonly assigned, co-pending U.S. patent application Ser. No. 12/948,892, entitled: "Method For Remotely Configuring A Digital Image Display Device", by Lawrence Landry; to commonly assigned, co-pending U.S. patent application Ser. No. 12/949,086, entitled: "Digital Image Display Device With Remote Viewing Interface", by Michael Telek, each of which is incorporated herein by reference.

FIELD OF THE INVENTION

This invention pertains to the field of digital media frames, and more particularly to a digital media frame having an automatically adjusted image display duration.

BACKGROUND OF THE INVENTION

A digital media frame (also called a digital photo frame, a digital picture frame or a digital image display device) is a device that electronically stores and displays digital images. As used herein, the term digital image includes both digital still images and digital video images. The digital images are typically captured using digital cameras (still or video), but may also be obtained using other types of digital image sources such as scanners. For example, U.S. Pat. No. 4,754,271 to Edwards, entitled "Liquid Crystal Photograph," describes a device resembling a pocket calculator which stores still pictures in a digital memory cartridge, and displays the pictures on a liquid crystal display (LCD) screen. The device includes an auto-sequencing mode which automatically changes the displayed image after a user-selectable time period, such as 5 seconds, or 5 minutes.

Digital media frames can include a modem to receive digital images over a communications network from computers or other devices, as described in commonly-assigned U.S. Pat. No. 7,155,679 "Digital Media Frame" to Bandaru, et al., which is incorporated herein by reference. Such a digital media frame is commonly known as a "connected frame." This patent further teaches that the connected digital media frame can include an information mode which displays news headlines, stock trading news, weather reports, and advertising received over the communications network.

Some digital media frames can receive digital images over a network from a "share group" which includes a plurality of members, as described in commonly-assigned U.S. Pat. No. 6,509,910, entitled "Method and system for interfacing with a digital media frame network," to Agarwal et al., which is incorporated herein by reference. This patent teaches that images provided by various sharing members can be downloaded from a network service and automatically displayed on digital media frames which communicate with the network service.

FrameChannel is an Internet service that can be used with a digital media frame having a modem which enables an Internet connection, such as a WiFi modem, that enables communication with an Internet Service Provider (ISP) via a wireless home router. A FrameChannel customer can use a home computer to access the FrameChannel website (www.framechannel.com) in order to customize the content that will be provided to their digital media frame. The customer can select from many different channels of custom content including news, traffic, weather, sports, and financial data. The customer can also use FrameChannel to receive photos from social networking or digital image sharing websites such as Facebook and Flickr, and to receive photos via E-mail and camera phone messages.

Digital media frames are often purchased as gifts for others, such as parents and grandparents. In many cases, it is desirable to pre-configure the digital media frame before giving it to the recipient, for example, with images of children and grandchildren. In many cases, the pictures can be added to the digital media frame using a removable memory. However, this requires opening the box containing the digital media frame after it is purchased, which is not desirable in most gift-giving situations. As an alternative, the removable memory can be packaged and wrapped separately from the box. However, this requires that the digital media frame include a removable memory interface, which adds cost. It also requires that the recipient know how to connect the removable memory to the interface, which may be difficult for an elderly recipient.

If the digital media frame is a connected frame, it is possible to supply content to the frame over a network. However, this normally requires that the frame be configured to interface over the network with the web site that will supply the content. In order to accomplish this, the person providing the gift must typically open the manufacturer's packaging to obtain serial numbers or codes required for device configuration. As stated earlier, this is not desirable in most gift-giving situations.

In some situations, the person viewing the connected frame does not want the device to continuously display images, either because this is thought to consume excessive power or because a continuous display may become distracting to them. However, when new images are received by the connected frame, most viewers would like to view them immediately. Unfortunately, current "connected frames" require the viewer to manually turn on the display, in order to see if any new images have been received. This is inconvenient. Furthermore, in some situations the person who provided the new images over the network to the "connected frame" would like to have a conversation related to the new images with the viewer of the connected frame. This can be difficult, however, since the person providing the images over the network is at a different location, and does not know which of the new images is currently being displayed on the connected frame.

In some situations, the person receiving the connected frame is an elderly person, who might not be knowledgeable or physically able to select the connected frame features that would be most appropriate for them. In some cases, the person providing the connected frame is best able to select these features for the recipient, but may be located in a different city or state. Furthermore, even if the person providing the connected frame travels to an elderly recipient's location in order to set the desired features and modes, the recipient may later inadvertently make inappropriate selections on the user interface of the connected frame. These selections would then override the desired settings and modes which had been set by the person who provided the connected frame.

In some situations, the desired mode for a connected frame is an auto-sequencing (e.g., "slideshow") mode, which displays a sequence of digital images, such as still pictures, for a predetermined period of time. When new images are received by the connected frame, it is often desirable to view them in a relatively rapid sequence. For example, it might be desirable to display a new image every 10 seconds. However, such a relatively short update rate can be bothersome to some viewers of the connected frame if it is used continuously, for many hours or many days. Unfortunately, current digital media frames only allow a user to select one specific slideshow time period (e.g., 5 seconds, 10 seconds, 1 minute, or 5 minutes) to be used until it is manually changed by the viewer.

What is needed is a method for remote pre-configuration of a digital image display device, such as a digital media frame, which is purchased with the intention of giving it to a recipient, and for overcoming other limitations and disadvantages associated with the use of connected frames.

SUMMARY OF THE INVENTION

The present invention represents a digital image display device for displaying a collection of digital images, comprising:

a display screen;
a processor;
a real-time clock;
an image memory for storing a plurality of digital images; and
a processor-accessible program memory storing executable instructions for causing the processor to execute the steps of:
  initiating a sequential display of a sequence of digital images on the display screen at an initial time, the sequence of digital images including at least a subset of the stored digital images, each digital image being displayed for an image display duration, the image display duration being set to an initial image display duration at the initial time; and
  modifying the image display duration during the display of the sequence of digital images.

This invention has the advantage that when new digital images are received by a digital image display device they can be initially viewed with a short image display duration.

It has the additional advantage that after the received digital images have been viewed for a specified period of time, a longer display duration can be used to avoid distracting users.

BRIEF DESCRIPTION OF THE DRAWINGS

FIG. 1 is a high-level diagram depicting the components of a digital image display device;

Figure 2B:
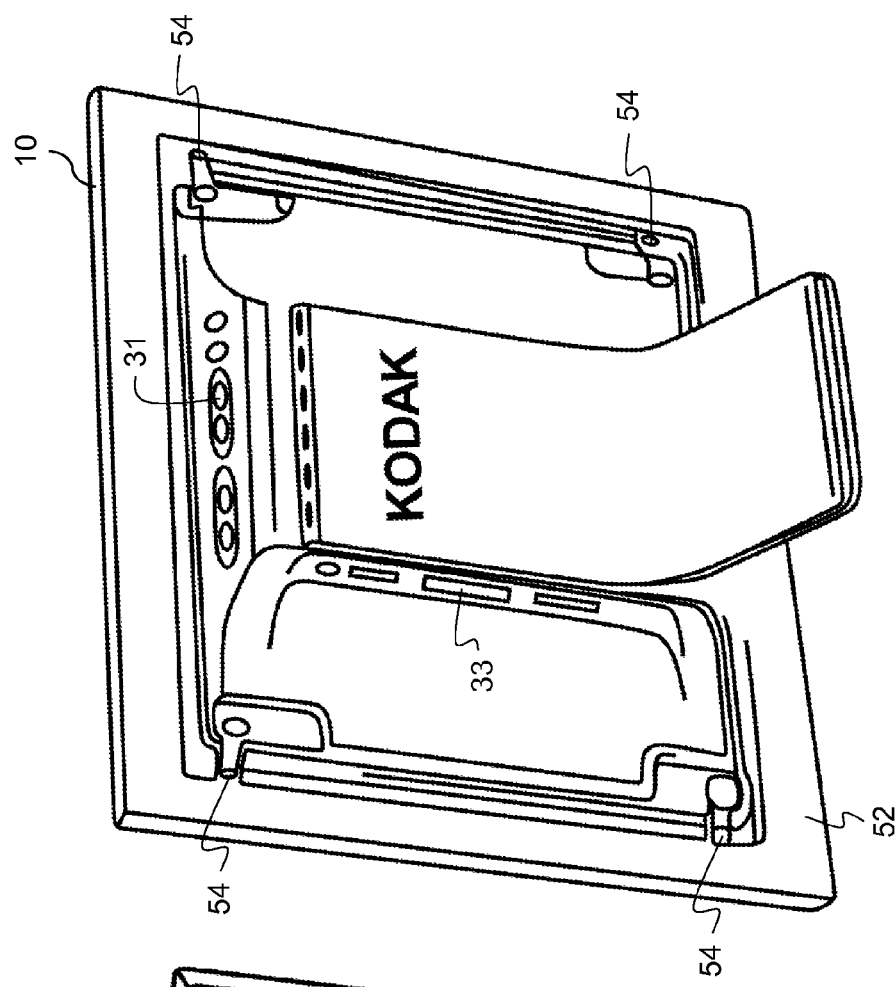
FIG. 2A and FIG. 2B depict the front and back of a digital image display device.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory computer readable storage medium, which can include, for example; magnetic storage media such as a magnetic disk (e.g., a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital media frames and related circuitry for providing digital interfaces, digital image storage, digital image processing, and image display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of digital media frames will be familiar to one skilled in the art. It will be obvious that there are many variations of this embodiment that are possible and are selected to reduce the cost, add features or improve the performance of the digital media frame. The present invention is illustrated by way of example and not limitation in the accompanying figures.

Figure 2A:
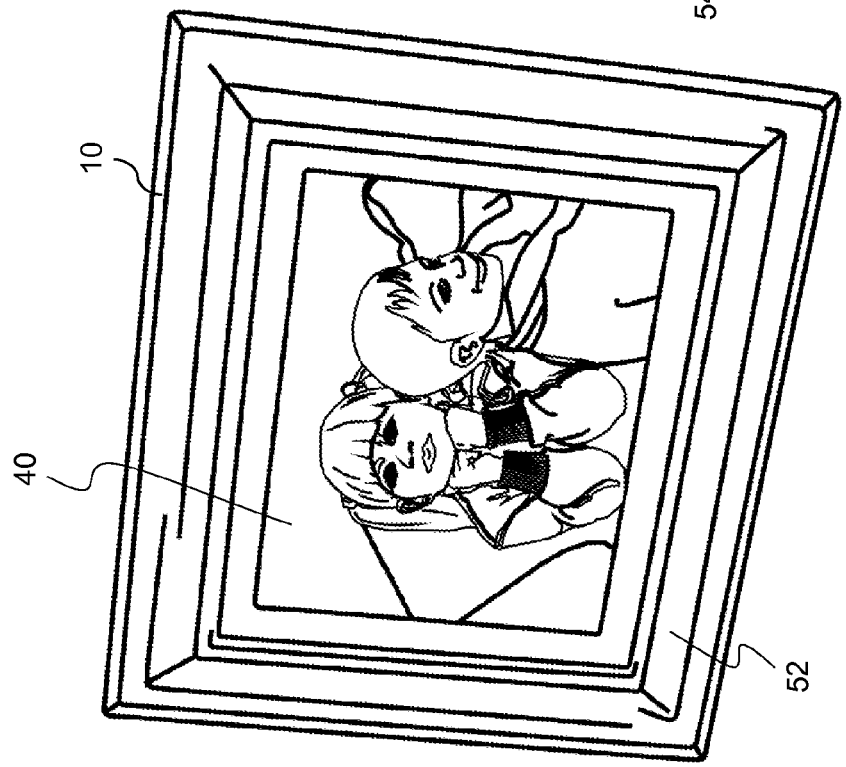

FIG. 1 is a high-level block diagram depicting an embodiment of a digital image display device 10. In a preferred embodiment, the digital image display device 10 is a digital media frame (i.e., a digital picture frame or a digital photo frame). However, in other embodiments, the digital image display device 10 can be any device having the ability to display digital media assets on a soft-copy display. Digital media assets would include both digital still images and digital video images. Examples of other types of digital image display devices 10 that can be used in accordance with the present invention would include tablet computers, personal computers, hand-held electronic devices (e.g., smart phones, PDAs or digital media players) and digital televisions. FIG. 2A depicts an embodiment of a front view of the digital image display device 10, and FIG. 2B depicts an embodiment of a rear view of the digital image display device 10. The digital image display device 10 includes a frame surround 52 which can be removed by moving the sliders 54 and replacing the frame surround 52 with a different frame surround, which may have a different color, finish, etc.

The digital image display device 10 allows a user to display digital media assets with minimal user intervention. The digital media assets to be displayed typically includes digital still images captured with a digital camera. The digital media assets to be displayed can also include video clips, graphic images, text, and animations. The digital media assets can also include audio information, such as music, speech, and sound effects.

Referring to FIG. 1, a central processor 20 in the digital image display device 10 provides the overall control of the digital image display device 10. The central processor 20 is coupled to a user input interfaces block 30, which enables a user of the digital image display device 10 to select operating modes and images to be displayed. The central processor 20 is also coupled to a media interface block 32, and a network interface block 34, which are used to provide digital media assets to the digital image display device 10. The central processor 20 is also coupled to a non-volatile storage block 22 via an interface, which provides a processor-accessible program memory that stores executable instructions that are used to control the operation of the central processor 20. Non-volatile storage block 22 can also serve as a processor-accessible image memory for storing a collection of digital media assets.

The central processor 20 is also coupled to a buffer memory block 24, which temporarily stores digital media assets for display on display screen 40. The central processor 20 is also coupled to a display compensation block 42, which processes the digital images and provides the compensated digital images to the display screen 40. The central processor 20 is also coupled to an audio codec block 46, which processes digital audio information and converts the digital audio information to one or more analog signals, which are provided to one or more speakers 44.

The user input interfaces block 30 can be provided using various conventional user input devices and circuits. For example, the user input interfaces block 30 can include a group of user buttons 31, such as those provided on the upper back of the digital image display device 10 in FIG. 2B. These user buttons 31 can include, for example, a forward function button, a reverse function button, and a pause function button. The forward function button allows the user to initiate the display of the next image in a playlist, the reverse function button allows the user to initiate the display of the previous image in a playlist, and the pause function button allows the user to initiate the continued display of the current image, until a different function button is pressed by the user. The user buttons 31 can also include a "menu" button, a "select" button" and a number of cursor movement buttons, such as "up," "down," "left" and "right," or some subset thereof. These can be used to select various operating modes.

In some embodiments, the user input interfaces block 30 includes a touch screen interface provided on the front surface of the display screen 40. In some embodiments, the touch screen interface can be implemented using IR emitters and detectors in front of, and parallel to, the display screen 40. A "touch" is detected by determining which IR beams have been blocked by the viewer's finger. In some embodiments, this can be implemented using a relatively small number of emitters and detectors. For example, using 5 emitters spaced vertically and 8 detectors spaced horizontally, enables the detection of 5×8 positions on the display screen. This is enough to allow touch buttons icons to be displayed on the display screen 40 and discern which button icon was touched by the viewer. In some embodiments, the user input interfaces block 30 includes a touch sensitive input surface that can be positioned adjacent to the display screen 40. For example, the KODAK EASYSHARE P730 Digital Frame includes two "Quick Touch Border" capacitive touch strips, including a horizontally oriented touch strip adjacent the bottom of the display screen 40 and a vertically oriented touch strip adjacent the right side of the display screen 40. Menu items are displayed on the display screen 40 adjacent to these touch strips, and the viewer touches the strip at the appropriate location in order to select menu items. One advantage of the Quick Touch Border is that it keeps fingerprints off of the display screen 40.

In some embodiments, the user input interface can also include a pointing device such as a computer mouse, a joy stick, a track ball, or a track pad. In some embodiments, the user input interface can also include a remote control input device. The remote control can include user inputs which replicate some or all of the functions provided by the user buttons 31. In some embodiments, the user input interface can also include a voice recognition interface (including a microphone and speech recognition processor) or a gesture recognition interface that includes a sensing device (such as a camera) which recognizes user hand gestures or other user movements.

Non-volatile storage block 22 represents non-volatile storage memory, which may include, for example, flash EPROM memory. Non-volatile storage block 22 provides a processor-accessible program memory for storing executable instructions, such as firmware programs, for controlling the operation of the central processor 20.

In some embodiments, the firmware programs stored in non-volatile memory block 22 can be updated or replaced by new firmware provided using the media interface block 32 or the network interface block 34. In some embodiments, other types of non-volatile memory, such as Read Only Memory (ROM), magnetic disk storage or optical disc storage, can be used. In some embodiments, the central processor 20 includes an additional program memory (not shown), and the firmware programs stored in the non-volatile storage block 22 are copied into the program memory before being executed by the central processor 20.

The non-volatile storage block 22 can also be used to provide a processor-accessible image memory for storing a collection of digital media assets such as still images, video clips, sounds music, graphics, text, and other types of content which can be used to create the images displayed on the display screen 40 and the sounds output from speaker(s) 44. These sounds can include sounds captured by the digital still or video camera when the digital images were captured. These sounds can also include sounds (such as audio annotations) captured when the images were previously viewed, either by the user or another individual. These sounds can also include songs or music soundtracks that have been associated with the digital images. In some embodiments, at least some of the stored digital media assets are associated with particular events either automatically as a result of the image capture date, or as a result of manual selection by the user. The sounds can also include audio content associated with the particular events.

The non-volatile storage block 22 also stores auxiliary information (e.g. metadata) associated with the digital media assets. This metadata can include the date and time the image was captured by a digital capture device (e.g., a digital still camera or a digital video camera), or the date and time the image was received by the digital image display device 10. The metadata can also include data which identifies the individual or service that provided the digital media assets that was transferred to the digital image display device 10 using the system to be described later in reference to FIG. 3. In some embodiments, the metadata associated with a particular digital image can include one or more parameters that can be used to control how the particular digital image is to be displayed on the digital image display device 10. For example, the metadata can include a custom image display duration for the digital image, or a image display sequence number indicating an order in which the digital images should be displayed. As another example, the metadata can include an importance rating for the digital image, as described in commonly-assigned U.S. Pat. No. 7,307,636 to Matraszek, et al., which is incorporated herein by reference. In this case, the image display duration can be determined, in part, by the rating, so that a digital image having a higher importance rating is displayed for a longer period, or more frequently, than an image having a lower importance rating.

Buffer memory block 24 is a relatively small memory (compared to non-volatile storage block 22) which provides fast memory access for displaying images. The buffer memory block 24 can use, for example, one or more dynamic random access memory ("DRAM") or static random access memory ("SRAM") integrated circuits.

The media interface block 32 receives digital media files from various local external devices, such as removable media devices. For example, the media interface block 32 can include memory card and USB interface connectors 33 (FIG. 2B), to enable the digital image display device 10 to display media files stored on various removable Flash memory cards, such as a Secure Digital (SD) card, a micro SD card, a Compact Flash (CF) card, a MultiMedia Card (MMC), an xD card or a Memory Stick, as well as USB memory "sticks" or "jump drives". The digital media assets stored on these memory devices can be provided by digital computers, digital still cameras, digital video cameras, camera phones, PDAs, print and film scanners, and other types of digital imaging devices. The central processor 20 controls the media interface block 32 in order to transfer media files from the local external devices. The transferred files can be stored in the non-volatile storage block 22, or can be stored directly in the buffer memory block 24 for immediate display on the display screen 40. Thus, the media interface block 32, in combination with the removable memory card or memory "stick", provides a processor-accessible image memory for storing a collection of digital media assets, such as digital images.

The network interface block 34 can be used to enable other devices, such as computers or mobile imaging devices, to transfer digital media files to the digital image display device 10. The network interface block 34 can be provided using a wired interface, such as an Ethernet cable interface or a wired telephone modem. The network interface block 34 can also be provided using a wireless interface, such as a WiFi (e.g. IEEE 802.11 WiFi standard) modem, a cellular modem, or a Bluetooth modem.

In some embodiments, the network interface block 34 provides a direct connection to the Internet, and is configured to read HTML ("HyperText Markup Language") and to use TCP/IP ("Transmission Control Protocol/Internet Protocol"). In other embodiments, the network interface block 34 provides a connection to a local area network, which can then provide an Internet connection using a wired or wireless router or other type of network interface device, which either interfaces directly to the Internet, or to an Internet Service Provider (ISP).

The display compensation block 42 is used to adjust the image data for the characteristics of the display screen 40. This can include tone scale adjustments, color adjustments, sharpness adjustments or any other type of appropriate adjustment. It should be noted that in some embodiments, the display compensation block 42 can be implemented by the central processor 20. In other embodiments, the display compensation block 42 and central processor 20 can be integrated into the same integrated circuit ("IC").

The display screen 40 displays images using a soft-copy display device, such as a color active matrix LCD ("Liquid Crystal Display"). Other types of soft-copy display devices may be used, such as an OLED ("Organic Light Emitting Diode") display, a CRT ("Cathode Ray Tube"), or various silicon-based displays.

A power supply 50 converts the AC power supplied via a wall plug to the proper DC voltages needed to provide power to all of the components of the digital image display device 10. In some embodiments, the power supply can include a re-chargeable battery, so that the digital image display device 10 can be portable, thus allowing it to be used for a period of time without a power cable, and outdoors. In some embodiments, the digital image display device 10 can include a solar panel which is used to charge the rechargeable battery.

The power supply 50 can include a power control circuit (not shown) which enables an active display mode for displaying images on the display screen 40 and a reduced power mode wherein the display screen 40 is turned off and does not display digital images. The power control circuit can be controlled by the central processor 20. The power control circuit can also control the power to other portions of the digital image display device 10, such as display compensation block 42, audio codec block 46, buffer memory block 24, and media interface block 32.

In some embodiments, the user input interfaces block 30 can enable a user to specify an "on time" for initiating the active display mode at a specified time of day, and an "off time" for initiating the reduced power mode at a specified time of day. For example, the digital image display device 10 can be configured to operate in the active display mode from 7:00 AM to 9:00 PM each day, and otherwise to operate in the reduced power mode. In some embodiments, a different schedule can be specified for weekdays and weekends. For example, if it is known that no viewers are generally present from 8:00 AM to 5:00 PM on weekdays, then the digital image display device 10 can also be configured to operate in the reduced power mode during those hours.

In some embodiments, the digital image display device 10 includes a motion sensor (not shown). The motion sensor can provide a signal to the central processor 20, which controls the power supply 50 in order to supply power to the display screen 40 only when motion is detected. This reduces the power wasted when displaying images if there are no viewers in the vicinity of the digital image display device 10.

The central processor 20 runs two primary processes in order to display images and communicate with other system components, as will be described later in reference to FIG. 4A and FIG. 4B. A real-time clock 21 in the central processor 20 provides a date/time of day value. In some embodiments, the real-time clock 21 is manually configured by the user while in other embodiments, the real-time clock is configured using information accessed on an external device such as a Network Time Protocol (NTP) server using the network interface block 34.

It will be understood that the functions of the central processor 20 can be provided using a single programmable processor or by using multiple programmable processors, including one or more digital signal processor (DSP) devices. Alternatively, the central processor 20 can be provided by custom circuitry (e.g., by one or more custom integrated circuits (ICs) designed specifically for use in digital media frames), or by a combination of programmable processor(s) and custom circuits. It will be understood that connections between the central processor 20 and some of the blocks shown in FIG. 1 can be made using a common data bus. For example, in some embodiments the connection between the central processor 20, the non-volatile storage block 22, the buffer memory block 24, the media interface block 32, and the network interface block 34 can be made using a common data bus.

Figure 3:
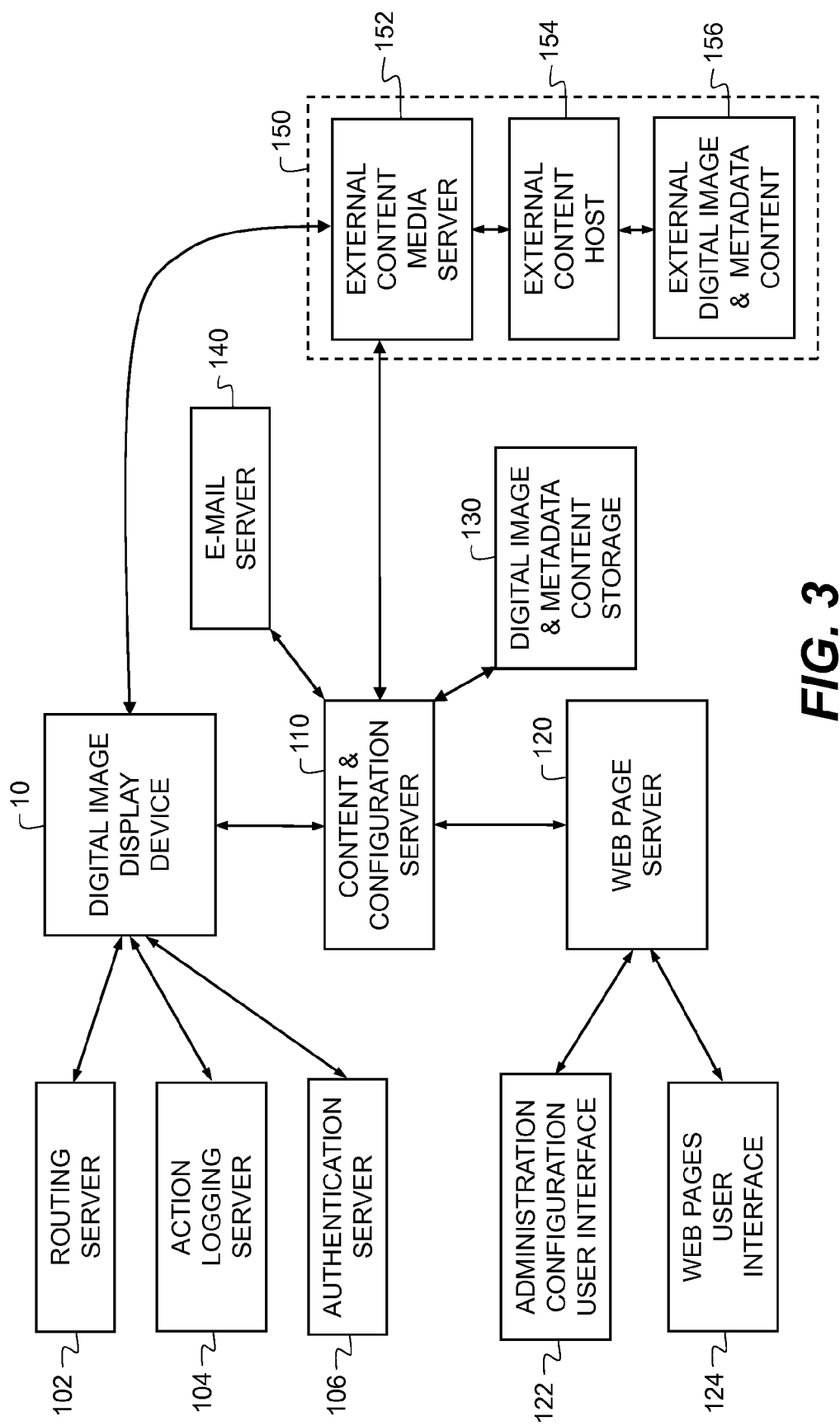
FIG. 3 is a high-level system diagram depicting how the digital image display device of FIG. 1 communicates with other devices to receive content and configuration information.

FIG. 3 is a high-level system diagram depicting an embodiment of how the digital image display device 10 can communicate over a network with other systems to receive content and configuration information. It will be understood that a large number of digital image display device 10 units, located at many different geographically dispersed locations, can be supported by the system depicted in FIG. 3. The digital image display device 10 communicates over a network (such as the Internet) with a routing server 102, an action logging server 104, and an authentication server 106. The digital image display device 10 also communicates over the network with content and configuration server 110. The content and configuration server 110 communicates with a web page server 120. The web page server 120 can be controlled by an administration configuration user interface 122 and a web pages user interface block 124. The content and configuration server 110 can obtain digital image and metadata content and store it in digital image and metadata content storage 130. The digital image and metadata content can originate into this system from an E-mail server 140, from the web page server 120 or from one or more content providing systems 150. The content providing systems 150 can provide content from a variety of sources, such as Facebook, Flickr, the Kodak Gallery, and other on-line content storage systems and services.

Each content providing system 150 can include an external content media server 152 which communicates with an external content host 154 in order to supply external digital image and metadata content 156. The external digital image and metadata content 156 can be stored on hard drives or other digital storage devices or media that can be accessed by the external content host 154.

In some embodiments, the content and configuration server 110 only provides a list of digital media assets together with appropriate information about each digital media asset. The digital image display device 10 can subsequently access digital media files directly from the content providing systems 150.

It will be understood that the various blocks shown in FIG. 3 can be implemented using different hardware configurations. For example, the routing server 102, action logging server 104 and authentication server 106 can execute on the same physical hardware, or on different hardware. Furthermore, each server, such as routing server 102, may execute on multiple pieces of hardware in order to execute operations in parallel.

Figure 4A:
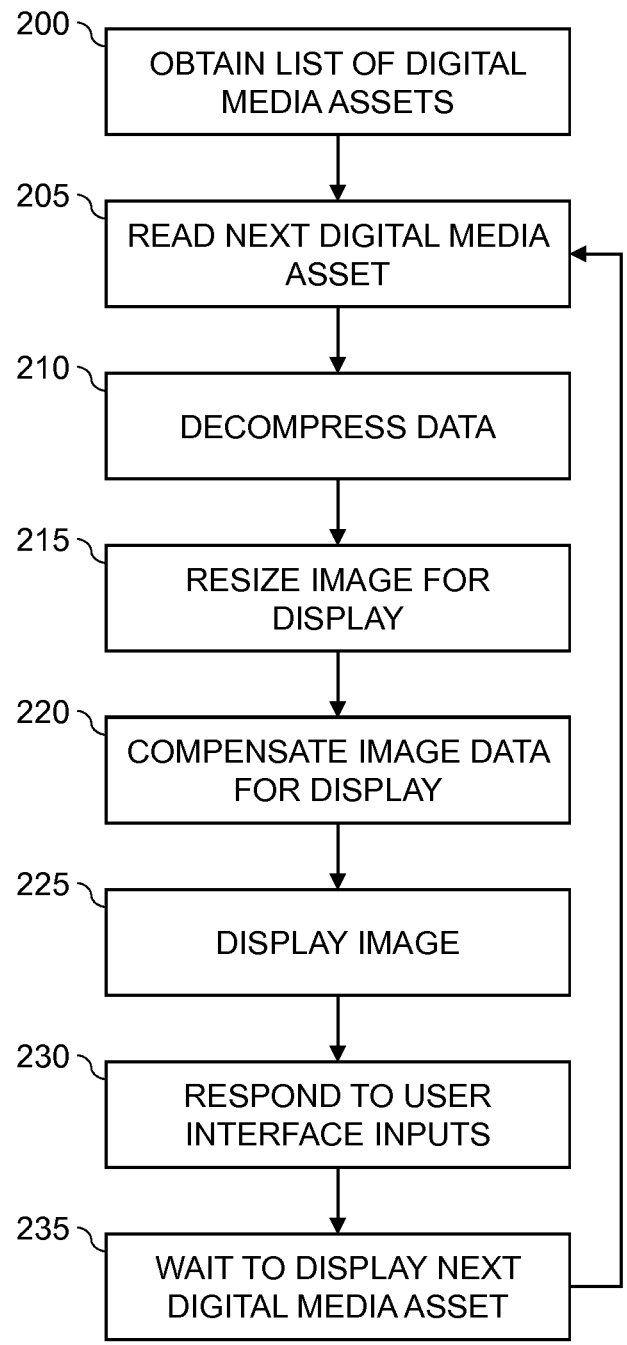
FIG. 4A is a high level flow diagram depicting a general image display process.

FIG. 4A is a high level flow diagram depicting a general image display process performed by the central processor 20 as a foreground process. In obtain list of digital media assets step 200, the central processor 20 gets a list of digital media assets to be displayed from the non-volatile storage block 22 or from some other digital media asset storage location (e.g., storage media connected via the media interface block 32, or a remote storage location accessible via the network interface block 34). A digital media asset is a discrete piece of digital media content such as a digital still image, a digital video clip, a digital audio clip or music file, as well as graphics, text, and other types of content that can be used to create the images displayed on the display screen 40 and the sounds output from speaker(s) 44 of the digital image display device 10. A collection of digital media assets is the set of all the digital media assets that are available for display or playback on the digital image display device 10. A list of digital media assets is a list of the individual digital media assets in the collection of digital media assets. This list can be stored as a formatted text file (e.g. an XML file), as a database or in some other custom storage format. The list can be provided in the display order in which content is to be displayed, or the display order can be specified as a separate field or as a subsequent list referring back to the assets in the list. In some operating modes of the digital image display device 10, the content is intentionally displayed in a randomized order.

In read next digital media asset step 205, the central processor 20 reads the list and determines the next digital media asset to display from the list. The central processor 20 then reads the digital media asset from the non-volatile storage block 22 or the storage media connected to media interface block 32. In some embodiments, the central processor 20 can read the digital media asset from a remote storage site via the network interface block 34.

In decompress data step 210, the central processor 20 decompresses the image data associated with the digital media asset and stores the decompressed image data in the buffer memory block 24. If the digital media asset is a video file, such as an MPEG 2 or MPEG 4 video file, the central processor 20 performs real-time decompression of the compressed video file.

In resize image for display step 215, the central processor 20 scales the image for display, by resizing the image as necessary in order to match the image size (i.e., the display screen resolution) required by display screen 40. In some embodiments, the image size stored in buffer memory block 24 is slightly larger than the screen resolution, in order to allow for some panning/zooming effects as the image is displayed.

In compensate image data for display step 220, the display compensation block 42 applies compensation to the image data before it is provided to the display screen 40. The compensation typically includes adjusting the image to account for the characteristics of the display screen 40 (e.g., an LCD panel). In some embodiments, the compensation may also adapt to the content of the specific image, for example, to provide image-specific enhancements.

In display image step 225, the central processor 20 displays the current image on the display screen 40. The central processor 20 can also display visual messages or user interface controls on the display screen 40, to indicate to the user of the digital image display device 10 various operating modes and options that can be selected by the user. In some embodiments, the central processor 20 provides these messages and controls using an on-screen graphics buffer, which can be stored in a portion of buffer memory block 24. The graphics information provided from this on-screen graphics buffer can be blended with the currently displayed image when the user activates one of the user interface elements of the user input interfaces block 30, such as a touch screen interface. In some embodiments, the text and icons are transparently overlaid on top of the currently displayed image.

In respond to user interface inputs step 230, if the user makes a selection using one of the user input elements, the central processor 20 takes one or more actions in response to the user selection. This can include, for example, changing the display time for images, deleting an image from the collection of digital media assets, or selecting a subset of the collection of digital media assets to display.

In wait to display next digital media asset step 235, the central processor waits until the real-time clock 21 has advanced by a specified time interval between images, and then execution returns to the read next digital media asset step 205. The specified time interval can be a factory default time interval (e.g., 10 seconds per image) or can be a time interval selected by the user using appropriate user interface elements. The central processor 20 also controls the type of transition between images. The transition is a mechanism of "retiring" the current image while "phasing in" the next image. For example, one type of image transition moves the current and next images in one direction (e.g. left to right, or top to bottom) such that the current image moves out while the next image moves in. In another example, the image transition fades out the current image while fading in the next image on top of the current image. Those skilled in the art will recognize that many different types of transitions can also be used.

Figure 4B:
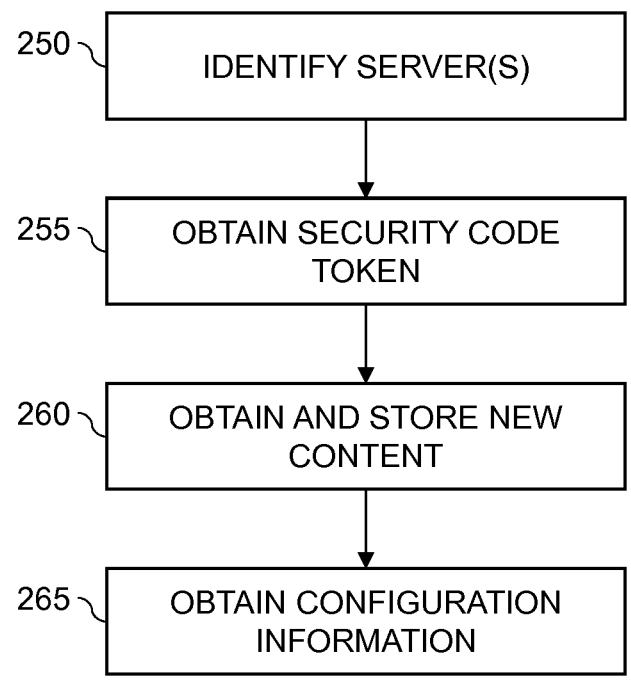
FIG. 4B is a high level flow diagram depicting a general system communications process.

FIG. 4B is a high level flow diagram depicting a general system communications process for secure information exchange over an insecure network, which is performed by the central processor 20 via the network interface block 34 as a background process. In some embodiments, the network interface block 34 is a WiFi wireless interface, which enables the digital image display device 10 to wirelessly communicate with various servers such as routing server 102, action logging server 104, authentication server 106 and content and configuration server 110 over a network, such as the Internet.

At startup, an identify server(s) step 250 is performed, during which the digital image display device 10 interfaces via network interface block 34 over the Internet to the routing server 102 at a known server location, in order to identify itself and determine how to proceed. The routing server 102 returns information to the digital image display device 10 that indicates which server(s) the digital image display device 10 should communicate with for all subsequent functions. The only address that is not allowed to change is the path to this routing server 102.

In obtain security code token step 255, the digital image display device 10 uses a secure communication method (e.g. https://) to query the authentication server 106 for a security code to communicate with the rest of the system. This query involves transmission of private information that is known by both the digital image display device 10 and the authentication server 106. The authentication server 106 generates a temporary security token and returns the token to the digital image display device 10. The token is made available to other parts of the server (and other servers) to allow authentication of the particular digital image display device 10 for future operations.

When the time window for the authentication token expires, any operations from the digital image display device 10 to one of the servers (other than the authentication server 106) will be rejected. In this situation, the digital image display device 10 then communicates with the authentication server 106 in order to acquire a new authentication token, before continuing with other operations. The use of a temporary token for most of the communications between the digital image display device 10 and each of the servers has the advantage of minimizing exposure to the private information shared between the digital image display device 10 and the authentication server 106 and the advantage of minimizing the computation required for subsequent communications by reducing the need for secure communications with a temporary token.

In obtain and store new content step 260, the digital image display device 10 communicates with the content and configuration server 110 in order to retrieve any new content that may be available. The digital image and metadata content provided by the content and configuration server 110 is organized into groups of pictures that are grouped by some combination of the source of the content (e.g., E-mail, Facebook or Kodak Gallery), a unique identifier of the sender of that content (e.g., the E-mail address of the sender who provided the content), and the date and time that the particular content was shared (or the instance of sharing). In some embodiments, a direct network upload sharing method can be used to provide content directly to the digital image display device 10. The direct network upload sharing method can make use of various interfaces such as the well-known FTP or REST interfaces.

The digital image and metadata content provided by the content and configuration server 110 may also be organized by other information related to each particular content such as the location where the particular content was captured, keywords associated with the particular content, names or identity of people captured in the particular content, or things captured in the particular content.

The digital image and metadata content is obtained through a separate interface to content and configuration server 110, and is stored using an appropriate non-volatile storage (not shown) available to the content and configuration server 110. The content and configuration server 110 sends a description of the new content to be stored on the digital image display device 10. The central processor 20 in the digital image display device 10 then individually retrieves each of the digital media assets defined by the content and configuration server 110 and stores each digital media asset in the non-volatile storage block 22 in the digital image display device 10. The digital image display device 10 also transfers metadata related to each digital media asset, such as the sharing method (e.g., E-mail, Facebook or Kodak Gallery), an identifier for the individual providing the digital media asset, an identifier of the sharing instance, and any descriptive text available related to the digital media asset. In some embodiments, the digital media assets are only downloaded from the content and configuration server 110 at the time when they are to be displayed on the digital image display device 10, and are not stored locally in the non-volatile storage block 22 in the digital image display device 10. In some embodiments, the digital media assets are stored in non-volatile storage block 22 using a cache mechanism and the digital media assets are retrieved from the non-volatile storage block 22 if the digital media asset is stored in the non-volatile storage block 22 and has not been updated on the content and configuration server 110, and further, if the digital media asset is not stored in the non-volatile storage block 22 the central processor 20 retrieves the digital media asset from the content and configuration server 110 and stores the asset into the cache mechanism stored on the non-volatile storage block 22. The details of the data cache mechanism will be familiar to one knowledgeable in the arts.

The user can add content to the digital image display device 10 by using a web browser upload sharing method via the web pages user interface block 124 to upload digital images and other digital media assets to the web page server 120. The web page server 120 then stores these digital media assets and appropriate metadata.

In obtain configuration information step 265, the digital image display device 10 communicates with the content and configuration server 110 in order to retrieve configuration information. The configuration information includes settings such as the type of slideshow transition, the time interval for displaying each slideshow image, and the time of day to automatically turn the digital image display device 10 on and off.

In some embodiments, factory default configuration information is stored on the content and configuration server 110 automatically when a digital image display device 10 is registered. The user can utilize the web pages user interface block 124 to modify the configuration information. Additionally, configuration information can be modified by a system administrator using the administrator configuration user interface 122, in order to address any service related issues or to provide updates.

As will be described later in reference to FIG. 6, the user can use the web pages user interface block 124 to permit E-mail transfer of digital media assets to their particular digital image display device 10. In this case, the user enters a specific E-mail address to enable content to be sent to their digital image display device 10. When E-mail is sent (typically by others) to that address on the E-mail server 140, the digital images and other relevant content is extracted from the E-mail and transferred to the digital image and metadata content storage 130. Metadata about the sender, sharing date, etc. is also stored in association with this content.

The user can also use the web pages user interface block 124 to configure their digital image display device 10 to receive digital media assets that are provided from one or more content providing systems 150 through various external services on the Internet. There are two primary mechanisms for how content is transferred from the external content providing systems 150, depending on how the external system operates.

In a first "pull" mechanism, the content and configuration server 110 periodically polls the external content media server 152 to determine whether new external digital image and metadata content 156 is available from external content host 154. If new content is available, the content and configuration server 110 retrieves the metadata for the new content and stores it in the digital image and metadata content storage 130. The original digital media asset data (e.g., still digital image or digital video file) is not transferred. When the digital image display device 10 later retrieves the list of digital media assets to retrieve, the URL for this new digital media asset will point back to the corresponding external content media server 152.

In a second "push" mechanism, the external content media server 152 provides a notification when new external digital image and metadata content 156 is available from external content host 154. In this case, the content and configuration server 110 configures the external content media server 152 to provide a notification whenever relevant additions or changes are made for the content requested. The external content media server 152 then notifies the content and configuration server 110 when content is added, modified or removed. The content and configuration server 110 then updates the digital image and metadata content stored on the digital image and metadata content storage 130 to reflect the new state of the external content providing systems 150. It will be understood that the content and configuration server 110 stores configuration information for a large number of digital image display device 10 units, and that each digital image display device 10 can be configured to permit content to be provided from a number of different external content providing systems 150 (such as Facebook, Flickr, Kodak Gallery, etc.) using "pull" or "push" mechanisms. The obtain and store new content step 260 and the obtain configuration information step 265 are repeated at regular intervals (e.g., every ten minutes) in order to obtain new content for digital image display device 10. In another embodiment, the obtain configuration information step 265 can be initiated by a message being "pushed" from the content and configuration server 110 to the digital image display device 10 that indicated new or updated content may be available on the content and configuration server 110.

In some embodiments, the digital image display device 10 has an "informational" mode as well as a "pictorial digital media asset" mode. The informational mode of digital image display device 10 displays various information, such as news headlines, financial data, advertising, and the like. The information can be displayed instead of, or along with, the pictorial digital media assets. In the latter case, the digital image display device 10 dedicates a portion of the display screen 40 to pictorial display while another portion of the screen is apportioned to informational display. The informational display can be located adjacent to the pictorial display, or can be overlaid on top of the pictorial display. The information to be displayed can be provided using the system depicted in FIG. 3. The types of information to be provided can be configured for a particular user of digital image display device 10 by using the web pages user interface block 124 to select the particular information of interest to the user. This can include information about particular stocks, sport teams, weather reports, news categories, shopping, gambling, etc., which are of interest to the user. In some embodiments, the information can be provided by various information content web servers (not shown) which provide content to the content and configuration server 110. In other embodiments, the digital image display device 10 can communicate directly with the external web sites (not shown) that provide the information, in order to receive and display web pages, using a web browser implemented in the digital image display device 10.

Figure 5:
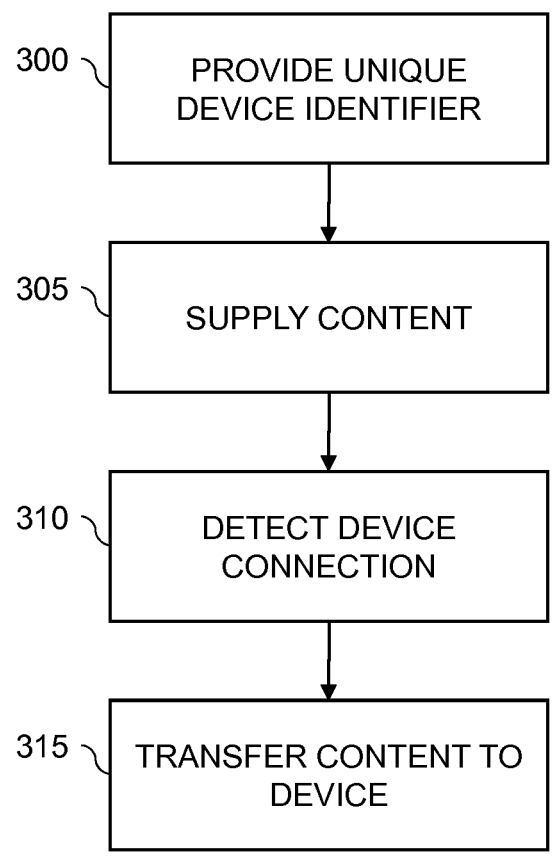
FIG. 5 is a flow diagram showing a method for remotely configuring a digital image display device.

FIG. 5 is a flow diagram showing a method for remotely configuring the digital image display device 10. This method can be used, for example, to remotely pre-configure a digital image display device 10 that has been purchased in a retail store, or over the Internet, and that will be given to a friend or family member as a gift.

In provide unique device identifier step 300, the company supplying the digital image display device 10 provides a unique device identifier, which is stored in the non-volatile storage block 22 of the digital image display device 10. In some embodiments, this unique device identifier is related to an activation code provided on the outside of the packaging used to package the digital image display device 10. For example, the activation code can be a sticker affixed to the outside of a sealed box which contains the digital image display device 10. Providing the activation code on the outside of the package enables the person who is giving the gift (i.e., the "purchaser") to pre-configure the digital image display device 10 without having to open the manufacturers' original packaging. This enables the digital image display device 10 to be personalized by the purchaser for the person receiving the gift (i.e., the "recipient"), while preserving the integrity of the original packaging. Moreover, the unique device identifier can be made available to the purchaser (e.g., via phone, E-mail, postal letter, or the like) without requiring the purchaser to have physical access to the digital image display device 10.

In some embodiments, the activation code is the product serial number for the digital image display device 10 or an encrypted code derived from the product serial number. Alternately, the activation code can be some other unique identifier associated with the digital image display device 10. As a result, it is unique for every unit of a given type of digital image display device 10. The use of encryption has the advantage that it makes it difficult for another person to guess at a series of activation codes, thereby stealing codes and being able to play pranks by putting pictures on yet to be purchased frames.

For example, the encrypted code can be a sparsely populated sequence of numbers such that only 1 code is valid in 10's of thousands of possibilities. Furthermore, the sequential codes can be made highly variable, such that guessing one code by knowing another is not obvious.

In some embodiments, the unique device identifier is made available to the purchaser of the digital image display device 10 electronically. For example, the purchaser may use an Internet website to purchase the digital image display device 10 for his or her parents. This may be accomplished using the methods described in commonly-assigned U.S. Pat. No. 6,937,997 to Parulski, entitled "Configuring and purchasing imaging devices," which is incorporated herein by reference. The purchaser's parents can live in another city, or even another country with different power plug requirements. The on-line retailer ships the digital image display device 10 directly to the purchaser's parents from their regional warehouse in the same country as the parents reside. The on-line retailer then sends an E-mail to the purchaser providing the unique device identifier, which can be an activation code.

In supply content step 305, the web page server 120 provides a web pages user interface block 124 which enables a content supplier to specify digital image content to be transferred to the digital image display device 10 that is associated with the unique device identifier that was provided in the provide unique device identifier step 300. The content supplier may be the purchaser of the digital image display device 10, or may be another person or party to whom the purchaser delegates this task. The content supplier uses the activation code to register the digital image display device 10 and then to select digital media content that is to be transferred to the digital image display device 10 after it is received by the recipient.

Figure 6:
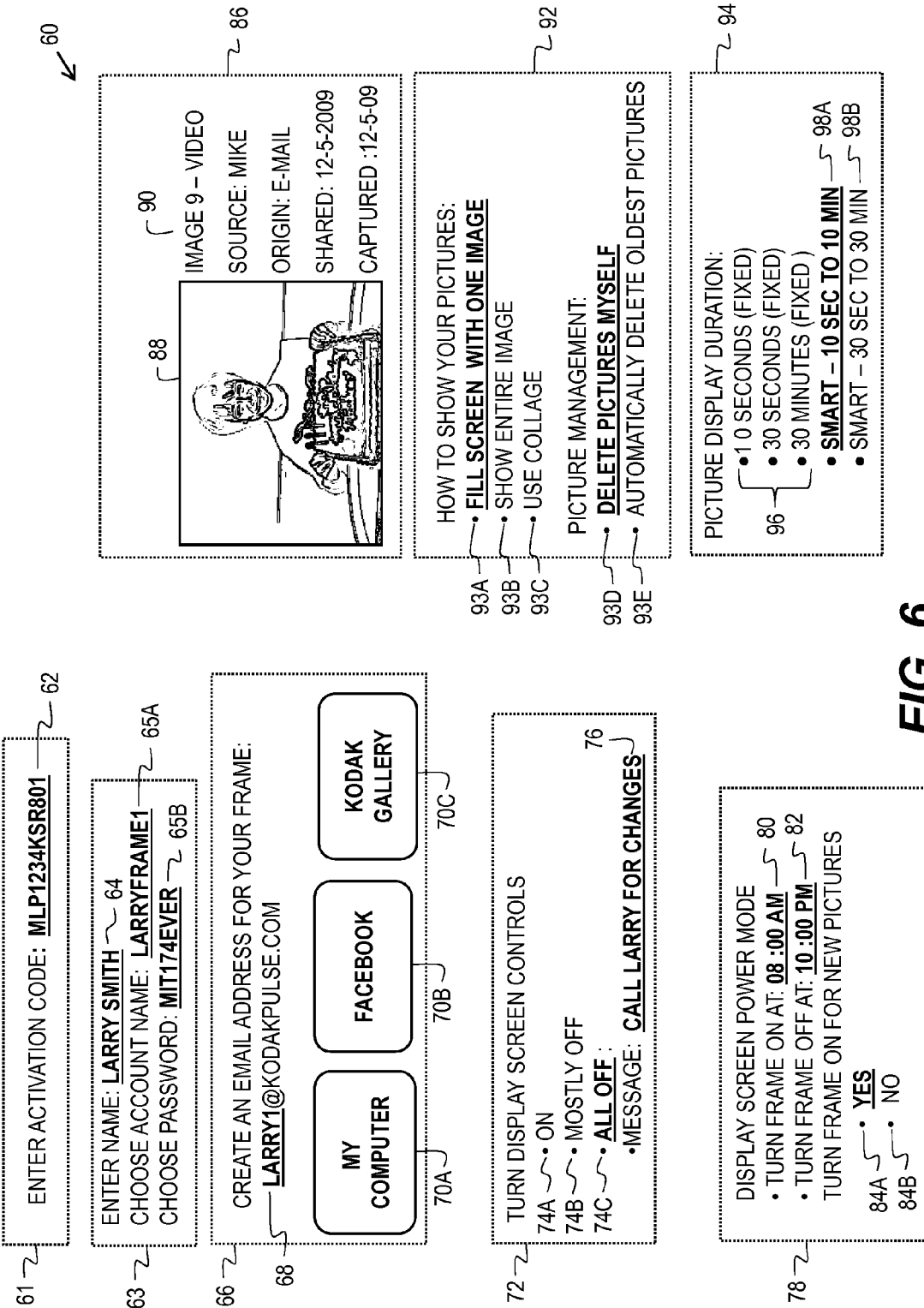
FIG. 6 is a graphical user interface which can be used to remotely configure a digital image display device.

FIG. 6 shows a remote graphical user interface 60 that can be used by the content supplier to specify digital image content to be transferred over the Internet to the digital image display device 10. In a preferred embodiment, the graphical user interface 60 is provided by a web site accessed using a conventional web browser (e.g., Internet Explorer). The graphical user interface 60 includes unique identifier entry section 61, which prompts the content supplier to enter a unique identifier, for example activation code 62, shown as "MLP1234KSR801".

In some embodiments, the unique identifier can be supplied as part of an Email or other electronic message received from the retailer which provided the digital image display device 10, so that it does not have to be manually entered by the purchaser or other content supplier. For example, an on-line retailer may send the purchaser an E-mail which includes a link associated with a particular activation code. When the purchaser "clicks" on the link in this E-mail, their computer can be directed to a web page having a version of the graphical user interface 60 that does not require unique identifier entry section 61. The E-mail link enables the content selections made by the content provider to be automatically associated with the particular digital image display device 10, without the content supplier either entering, or even seeing, the unique identifier that has been provided to them.

The graphical user interface 60 also includes an account creation section 63, which enables the content supplier to create an account for the particular digital image display device 10 associated with the activation code 62 on the content and configuration server 110. The account creation section 63 prompts the content supplier to enter a name 64 (e.g., Larry Smith), and to specify an account name 65A (e.g., "LarryFrame1") and an account password, 65B (e.g., "MIT174EVER"). The content supplier can update the selections made using graphical user interface 60 at a later date, by logging in using the account name and password rather than requiring the content supplier to reenter the activation code 62. It will be understood that the content and configuration server 110 stores digital image and metadata content for a large number of different accounts, each associated with a particular digital image display device 10, using digital image and metadata content storage 130.

The graphical user interface 60 also includes content selection entry section 66, which enables the content supplier to define a user E-mail address in E-mail address portion 68, by specifying an account identifier (e.g., "Larry1") that will be appended to a predetermined E-mail address portion (e.g., "@Kodakpulse.com") to create an E-mail address. The resulting E-mail address (e.g. Larry1@Kodakpulse.com") enables digital image content to be transferred over the Internet to the digital image display device 10 associated with the activation code 62 entered in unique identifier entry section 61.

The content selection entry section 66 also includes icons 70A, 70B and 70C that can be used to select digital image content (e.g., digital still images or digital videos) from various content sources. These content sources can include the content supplier's computer, which is selected using icon 70A, a social networking website (e.g., Facebook), which is selected using icon 70B, and an image sharing website (e.g., Kodak Gallery), which is selected using icon 70C.

When the content supplier selects My Computer icon 70A, a new user interface screen (not shown) is activated to enable the content supplier to select digital image content stored on their computer to be supplied to the digital image display device 10. This can be done, for example, by selecting specific digital images, or collections of digital images (e.g., a folder of images), that are stored on a hard drive or some other memory accessible on their computer.

When the content supplier selects the Facebook icon 70B, a new user interface screen (not shown) is activated to enable the content supplier to select a particular Facebook account (or a plurality of Facebook accounts) that will be used to supply images to the digital image display device 10. This can be done, for example, by selecting Facebook accounts corresponding to specific "friends.". When the friend's Facebook pages are updated, the new images can be automatically supplied to the digital image display device 10. Alternately, specific digital images or "albums" associated with a particular Facebook account can be selected in order to display only a portion of the digital images associated with a particular Facebook account.

When the content supplier selects Kodak Gallery icon 70C, a new user interface screen (not shown) is activated to enable the content supplier to select one or more Kodak Gallery accounts that will be used to supply images to the digital image display device 10. When new digital images are added to these accounts, the new digital images can be automatically supplied to the digital image display device 10. Alternately, specific "albums" associated with the specified Kodak Gallery accounts can be identified in order to display only a portion of the digital images associated with a particular Kodak Gallery account.

The remote graphical user interface 60 also includes a display screen controls section 72, which enable the content supplier to selectively disable some or all of the user interface controls of the digital image display device 10 that is associated with the activation code 62. The user interface controls in the display screen controls section 72 enable the content supplier to select between three options 74A, 74B and 74C. An On option 74A enables all of the user interface controls of the digital image display device 10 to operate normally. A Mostly Off option 74B disables all of the user interface controls of the digital image display device 10, except for a small subset of user interface controls. For example, the Mostly Off option 74B may enable only the "forward" and "reverse" function buttons described earlier in relation to FIG. 1. An All Off option 74C is selected by the content supplier in order to selectively disable all of the user interface controls of the digital image display device 10 which is associated with the activation code 62. The selected option, in this case All Off option 74C, is highlighted using a bold/underline font.

The display screen controls section 72 includes a message entry area 76, which enable the content supplier to input a message (e.g. "Call Larry for changes") that will be displayed on the display of the digital image display device 10 when the user attempts to activate one of the user interface controls that has been disabled. This message allows the user, who may be an elderly grandparent, to understand that their digital image display device 10 is functioning properly, and guides them concerning who to contact if they desire to modify the operation of their digital image display device 10.

The graphical user interface 60 also includes a display screen power mode section 78. The display screen power mode section 78 enables the content provider to select an on time 80, which is the time when the power control circuit in the digital image display device 10 will activate the active display mode and begin displaying digital images each day. The display screen power mode section 78 also enables the content provider to select an off time 82, which is the time when the power control circuit in the digital image display device 10 will activate the reduced power mode and stop displaying digital images each day. In some embodiments, different on times and off times can be specified for weekdays and weekends to reflect the fact that users may have different viewing habits on those days due to work schedules.

In some embodiments, the display screen power mode section 78 can include user interface elements (not shown) to enable a user to specify an inactive time of day interval during which the power control circuit will continue to operate in the reduced power mode if any new digital images are received from the content and configuration server 110. For example, the inactive time of day interval can be specified to correspond to the hours that the user is generally asleep so that the digital image display device 10 will not display images when there is no one there to observe the images, or when the light from the display screen 40 might disturb the user. In this case, if any digital images are received during the inactive time interval, then when the inactive time interval ends, the power control circuit can automatically be set to operate in the active display mode and the stored received digital images will be displayed on the display screen 40.

The display screen power mode section 78 also enables the content provider to select either a "Yes" option 84A or a "No" option 84B, which determines whether the power control circuit in the digital image display device 10 will activate the active display mode and begin displaying new digital images when new digital images are received by the digital image display device 10, even if the power control circuit is in the reduced power mode when the new digital images are received.

The graphical user interface 60 also includes a remote viewing interface section 86. The remote viewing interface section 86 can display a digital media asset 88, such as a digital still image or a digital video image, which corresponds to the digital media asset currently displayed on the display screen 40 of the digital image display device 10. This enables the content provider to know what digital media asset the viewer of the digital image display device 10 is currently viewing. This can be useful if the content provider is on the phone with the viewer and would like to comment on a particular digital image.

The remote viewing interface section 86 can also display metadata 90 associated with the displayed digital media asset. In the example, of FIG. 6, the metadata 90 includes a digital media asset identifier (e.g., "Image 9"), and a digital media asset type (e.g., "video"). The metadata 90 also includes a digital media asset source (e.g., "Mike") providing an indication of the person who provided the asset, and a digital media asset sharing method (e.g., "E-mail") providing an indication of the sharing method by which the digital media asset was provided. For example, sharing methods can include an E-mail sharing method (i.e., "E-mail"), social networking website sharing methods (e.g., "Facebook"), digital image sharing website sharing methods (e.g., "Kodak Gallery"), web browser upload sharing methods (e.g., "Web Upload") or direct network upload sharing methods (e.g., "Network Upload"). The metadata 90 also includes a sharing date ("Shared"), which provides the date on which the digital media asset was transferred to the digital image display device 10, as well as a capture date ("Captured"), which is the date that the digital media asset was captured by a digital camera, or scanned by a digital image scanner. The capture date metadata can be provided, for example, by the date/time metadata included in the well-known Exif-JPEG image format when the digital media asset was captured by a digital camera.

It will be understood that many other types of metadata 90 can be displayed in association with the digital media asset 88. This metadata 90 can include, for example, the names of people pictured in the digital media asset 88, which can be provided either manually by users, or using a face recognition algorithm. Likewise, the metadata 90 can include the names of objects pictured in the digital media asset 88 or capture locations for the digital media asset 88. The metadata 90 can also include other types of metadata such as album names, event names, captions, keywords and the like.

For cases where the digital image display devices is configured to simultaneously display a plurality of digital images in a collage format, the remote viewing interface section 86 can show information indicating each of the stored digital images that is currently displayed on the display screen (e.g., a representation of each digital image or metadata relating to each digital image).

It will be understood that in some embodiments, the remote viewing interface section 86 can include controls (not shown) which enable the content provider to change which digital media asset 88 is currently displayed on the display screen 40 of the digital image display device 10. The controls may include, for example, forward and backward controls to display the next or previous digital media asset in a sequence, respectively. The controls may also include a display of many thumbnail images, and a selector (e.g., a cursor) that enables the content provider to select a particular digital media asset to display on the display screen 40 of the digital image display device.

In some embodiments, if the digital image display device 10 has not yet been unpacked from its package and connected to the network (as will be described later in reference to the detect device connection step 310 of FIG. 5), the remote viewing interface section 86 can display a message indicating that the digital image display device 10 has not yet been connected to the network. This information can be used by the content provider to determine that the recipient of a gift of the digital image display device 10 may not have yet received it, or may not understand how to unpack it and connect it to a network. Similarly, if the digital image display device 10 has previously been connected to a network but is currently disconnected, the remote viewing interface section 86 can display a message indicating that the digital image display device 10 is currently inactive. In some embodiments, if the digital image display device 10 is in a reduced power mode, the remote viewing interface section 86 can display a message indicating that the digital image display device 10 is currently in the reduced power mode.

The remote graphical user interface 60 also includes a display mode and picture management section 92, which enables the content provider to select various preference settings. For example, the content provider can select between various display mode options provided by the digital image display device 10. In the example of FIG. 6, the content provider can select between several different image display styles including a "fill the screen with one image" option 93A (thus cropping off a portion of images having an aspect ratio that does not match the aspect ratio of display screen 40). Alternatively, the content provider can select a "show entire image" option 93B, which displays the entire digital image on the display screen 40, using black or colored borders to "pad" the edges of the digital image. Alternatively, the content provider can select a "use collage" option 93C to show a group of images together as a collage.

The display mode and picture management section 92 also enables the content provider to select between two picture management options, including a first "delete pictures myself" option 93D where digital media assets stored in the non-volatile storage block 22 of the digital image display device 10 are manually deleted, and a second "automatically delete oldest pictures" option 93E where the oldest images (e.g., the images associated with metadata 90 having the oldest "shared" date) are automatically deleted from the non-volatile storage block 22 by the central processor 20, in order to free up sufficient memory so that newly received digital media assets can be stored in the non-volatile storage block 22. If the non-volatile storage block 22 become full when the "delete pictures myself" option 93D is selected, then new digital images can not be automatically downloaded to the digital image display device 10. In this case, a warning message can be displayed in the display mode and picture management section 92 indicating that the memory is full.

The graphical user interface 60 also includes a picture display duration section 94, which enables the content provider to select between various picture display durations, such as fixed display duration options 96 of 10 second, 30 seconds, or 30 minutes, or "smart" display duration options 98A and 98B. The smart display duration options 98A and 98B include a first smart display duration option 98A that uses display durations of 10 seconds to 10 minutes, and a second smart display duration option 98B that uses display durations of 30 seconds to 30 minutes. These "smart" display duration options will be described later with reference to FIG. 10.

It will be understood that in some embodiments, the graphical user interface 60 can enable the content provider to choose between many other options related to how digital media assets are displayed on the display screen 40 of the digital image display device 10, providing many other types of preference settings. This can include choosing image transition methods (e.g., fades, wipes, pulls, etc.), image display sequence (e.g., random sequence, sorted by date) and image display effects (e.g., zoom and pan). It will be further understood that in some embodiments, the graphical user interface 60 can be used to select customized content to be displayed on the digital image display device 10 based on the date provided by the real-time clock 21, as described in commonly-assigned, co-pending U.S. patent application Ser. No. 12/911,959 to Krolczyk et al, entitled "Digital media frame providing customized content," which is incorporated herein by reference. It will be further understood that in some embodiments, the graphical user interface 60 could be used to create icons for individuals who are, or are expected to be, the source of digital images provided to the digital image display device 10, as described in commonly assigned U.S. patent application Ser. No. 12/946,055 filed Nov. 15, 2010 to Landry et al., entitled "Image display device providing improved media selection," which is incorporated herein by reference.

Returning to a discussion of FIG. 5, in detect device connection step 310 the recipient receives the digital image display device 10, unpacks it, and plugs it into a wall outlet to provide power to the power supply 50. If the network interface block 34 is a wired interface, such as an Ethernet interface or a telephone interface, the recipient plugs an interface wire into the network interface block 34 and the corresponding interface outlet (e.g., an Ethernet interface or a telephone outlet). If the network interface block 34 is a wireless interface, such as a WiFi interface or a cellular telephone interface, there is no need to provide an interface cable. In this case, the recipient can be prompted to select the desired WiFi wireless connection point and enter any associated network passwords.

After the digital image display device 10 is connected to the network, the central processor 20 then automatically attempts to establish a connection with the routing server 102, as described earlier in relation to the identify server(s) step 250 of FIG. 4B. The central processor 20 then queries the authentication server 106 for a security code, as described earlier in relation to the obtain security code token step 255 of FIG. 4B. The central processor 20 then communicates with the content and configuration server 110, and transmits an indication of the unique identifier stored in the non-volatile storage block 22. The indication of the unique identifier is received by the content and configuration server 110 which detects the device connection and uses the indication of the unique identifier to associate the particular digital image display device 10 with the digital media assets supplied by the content supplier in supply content step 305.

In transfer content to device step 315, the digital media assets supplied by the content supplier in supply content step 305 are transferred to the digital image display device 10 and stored in the non-volatile storage block 22. To accomplish this transfer, the content and configuration server 110 accesses the digital image and metadata content storage 130 in order to obtain the digital media assets in the account that was previously created by the content supplier in supply content step 305. In some embodiments, additional digital media assets can be transferred to the digital image display device 10 directly from one or more content providing services 150, as described earlier in relation to FIG. 4B. Moreover, the various preference settings and other selections made by the content provider in supply content step 305 are transferred from the content and configuration server 110 over the network to the network interface block 34, and are stored in the non-volatile storage block 22, in order to configure the digital image display device 10 according to the configuration information provided by the content provider (e.g., the purchaser) in supply content step 305.

As soon as the first digital media asset is received by the digital image display device 10, it can immediately be displayed on the display screen 40, while additional digital media assets are being received. The additional digital media assets can then be automatically displayed using a "slide show" mode, or another display mode, based on the selections made by the content provider in supply content step 305.

In some embodiments, the user of the digital image display device 10 is queried to verify that the user is willing to accept digital image content from a particular content supplier, before it is transferred in the transfer content to device step 315. This can prevent content provided by a person unfamiliar to the user, such as a "hacker" from being displayed on the display screen 40. The content provider can be identified by the name 64 or the account name 65A supplied using the graphical user interface 60.

In some embodiments, the user of the digital image display device 10 is enabled to specify a list of approved content suppliers from whom they are willing to accept digital image content. Any digital image content from an approved content supplier will then be automatically transferred to the digital image display device 10. Alternatively, the user of the digital image display device 10 can be permitted to specify a list of disapproved content suppliers from whom they are not willing to accept digital image content, and the digital image content from a disapproved content supplier will be rejected, rather than being transferred to the digital image display device 10. The user of the digital image display device 10 can be prompted for whether to accept digital image content from content suppliers who are not on the approved content provider list or the disapproved content provider list.

The method for providing digital image content described in relation to FIG. 5 provides a superior user experience when the digital image display device 10 is given as a gift, since the receiver of the gift does not have to learn any new techniques to be able to enjoy and use their new digital image display device 10. In the case where the digital image display device 10 is given as a gift to family members such as parents or grandparents, the user experience of the digital image display device 10 is enhanced if personalized pictures of the family, selected by the content supplier, are displayed soon after the digital image display device 10 is unpacked and turned on.

Figure 7:
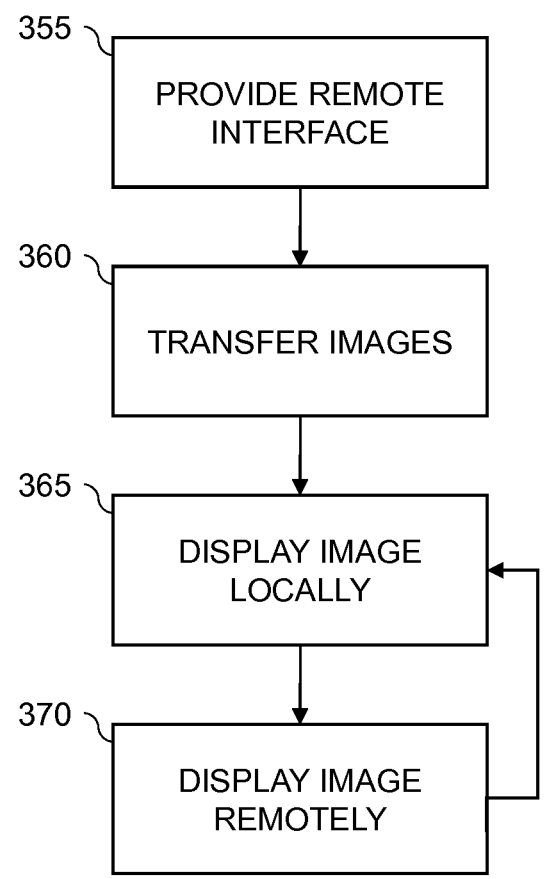
FIG. 7 is a flow diagram of a method for enabling a person to remotely view and control images displayed on a digital image display device.

FIG. 7 is a flow diagram for a method of enabling a person to remotely view and control digital images displayed on the digital image display device 10. This enables friends or family members related to the person who receives the digital image display device 10, who may be located in a different city or country, to know which digital images are currently being viewed on the display screen 40 of the digital image display device 10. This better enables storytelling between the friends and family members concerning the digital images displayed on the digital image display device 10, who may be talking on the telephone about images that have been shared with the user of the digital image display device 10.

In provide remote interface step 355, the image content and configuration server 110 communicates with web page server 120, which provides a web pages user interface block 124 having a remote viewing interface section 86, as described earlier in relation to FIG. 6. As was described earlier, in some embodiments, the remote viewing interface section 86 can include various remote user interface controls not shown in FIG. 6.

In transfer images step 360, a plurality of digital media assets, such as digital still images or digital video images, are transferred by content and configuration server 110 over the network to network interface block 34 of the digital image display device 10. The transferred digital media assets are stored in the non-volatile storage block 22. The digital media assets may be transferred at the time that the user is accessing the remote viewing interface section 86, or they may have been transferred at an earlier time, either automatically or manually.

In display image locally step 365, a first digital media asset, such as a digital still image, is read from the non-volatile storage block 22, processed by the central processor 20, and displayed on the display screen 40 as described earlier in reference to FIG. 4A. The display order can be obtained from a list, as described earlier in relation to the obtain list of digital media assets step 200 of FIG. 4A.

In some embodiments, the image to be displayed locally in display image locally step 365 can be controlled by a remote user interface, as described earlier in relation to the remote viewing interface section 86 of FIG. 6. In such embodiments, in response to a content provider selecting a particular digital media asset to be displayed using the remote user interface, digital media asset identification metadata that identifies one of the digital media assets currently stored in the non-volatile storage block 22 is communicated from the content and configuration server 110 to the digital image display device 10. The central processor 20 uses this digital media asset identification metadata to select the particular digital media asset for display in the display image locally step 365.

In display image remotely step 370, the remote viewing interface section 86 displays information indicating which of the digital media assets is currently being displayed on the display screen 40. This information can include an image display showing a representation of the digital media asset 88 (e.g., the digital media asset itself, or a thumbnail image showing a low-resolution version of the digital media asset). It can also include metadata 90 which identifies the digital media asset (e.g., a filename). It will be understood that as a result of network communications and processing delays, there may be a short time difference (e.g., a few seconds) between the time the digital image displayed on the display screen 40 changes according to the display image locally step 365 and the time that image and metadata displayed on the remote viewing interface section 86 changes according to the display image remotely step 370.

The display image locally step 365 and the display image remotely step 370 can be repeated in order to display a sequence of digital media assets. This sequence can be controlled automatically, for example when the digital image display device 10 is set to operate in an automatic "slideshow" mode. This sequence can also be controlled manually using the user input interfaces block 30 on the digital image display device 10, for example using "forward" and "backward" buttons. In some embodiments, the sequence can also be controlled manually using the graphical user interface 60, as was described earlier in reference to FIG. 6. In such a situation, it may be desirable to temporarily disable some of all of the user input interfaces block 30 of the digital image display device 10, in order to prevent conflicting user interface instructions.

Figure 8:
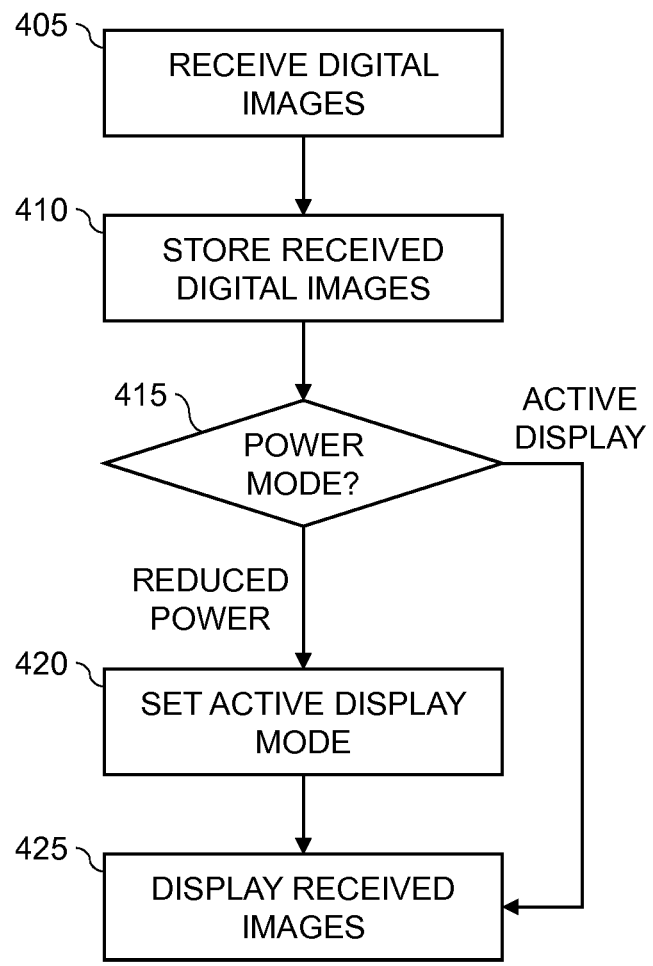
FIG. 8 is a flow diagram of a method for setting a digital image display device to operate in an active display mode when new content is received.

FIG. 8 is a flow diagram for selectively enabling the digital image display device 10 when new content is received. This allows a user of the digital image display device 10 to immediately know that new images have been shared, and to view them, even if the digital image display device 10 is in a reduced power mode and is not currently displaying images or other digital media assets. According to the method of FIG. 8, the digital image display device 10 is provided with a power supply 50 that includes a power control circuit (not shown). The power control circuit, under the control of the central processor 20, can be set to an active display mode which provides power to the display screen 40, and a reduced power mode wherein the display screen 40 does not display digital images.

In receive digital images step 405, the digital image display device 10 receives one or more digital images, or other digital media assets, from the content and configuration server 110 using the network interface block 34. This can be accomplished as described earlier in relation to the obtain and store new content step 260 of FIG. 4B.

In a store received digital images step 410, the received digital images or other digital media assets, are stored in non-volatile storage block 22 or using a removable storage media connected to media interface block 32, under the control of the central processor 20.

In power mode test 415, the central processor 20 determines if power control circuit is currently set to operate in the reduced power mode or the active display mode. This can be done, for example by checking a stored parameter, register, or control signal which indicates the current power mode.

It will be understood that the reduced power mode setting can be the result of the user turning the digital image display device 10 to an "off" setting using one of the user input interfaces block 30, or can be the result of the default behavior of the power control circuit when it is controlled responsive to the time of day determined using a real-time clock, as described earlier in reference to power supply 50 (FIG. 1). Thus, the default behavior of the power control circuit can be set by the user, who can specify one or more time of day intervals during which the power control circuit will be set to operate in the reduced power mode.

The default behavior of the power control circuit can also be defined by a set of time parameters received by the digital image display device 10 from the content and configuration server 110 via the network interface block 34. These parameters can be set by a remote individual using a remote user interface, such as the display screen power mode section 78 described earlier in reference to FIG. 6. For example, the on time 80 and the off time 82 can be used to specify parameters that are provided to the digital image display device 10 by the content and configuration server in obtain configuration information step 265 (FIG. 4B). It will be understood that in some embodiments, the remote graphical user interface 60 can enable the remote individual to enter several different time of day intervals during which the power control circuit will be set to operate in the reduced power mode.

If the power mode test 415 determines that the power control circuit is currently operating in the reduced power mode, a set active mode step 420 sets the power control circuit to operate in the active display mode. If the power mode test 415 determines that the power control circuit is currently operating in the active display mode, execution proceeds directly to display received images step 425. It will be understood that in some embodiments, the central processor 20 can automatically set the power control circuit to the active display mode without first checking the power mode in the power mode test 415. In this case, if the power control circuit is already in the active display mode, this action will have no effect.

In display received images step 425, the central processor 20 displays the stored received images on the display screen 40 of the digital image display device 10. In some embodiments, the central processor 20 stores the power mode determined by the power mode test 415, and if the power control circuit was in the reduced power mode setting at the time the power mode test 415 was executed, it resets the power control circuit to the reduced power mode after displaying the stored received digital images. The received digital images and other digital media assets may be displayed for a predetermined period of time, or each received digital media asset may be displayed for a predetermined number of times, prior to returning to the reduced power mode setting.

Figure 9:
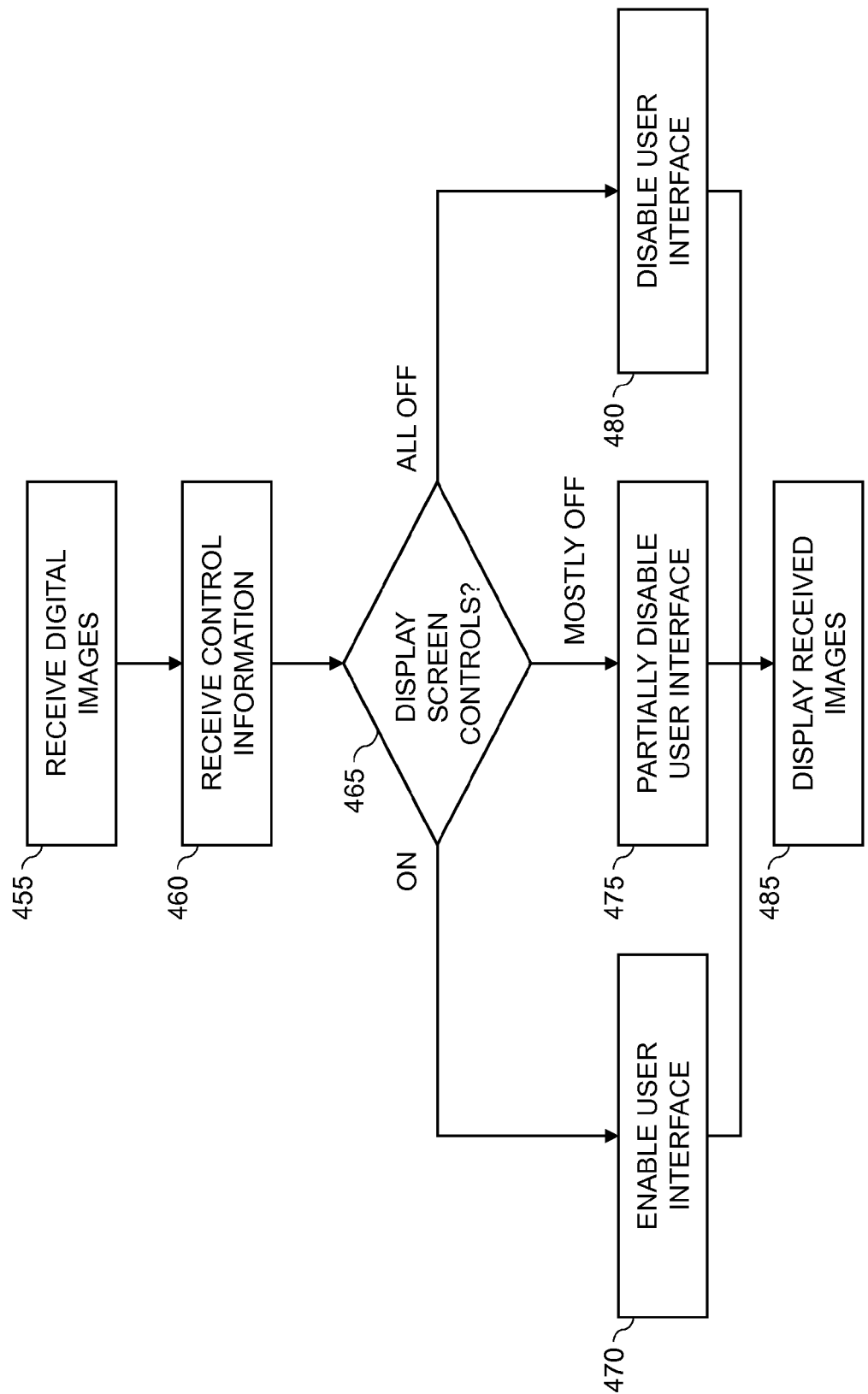
FIG. 9 is a flow diagram for remotely configuring the user interface of a digital image display device.

FIG. 9 is a flow diagram for remotely configuring the user interface of a digital image display device 10. The digital image display device 10, has a display screen 40 and a central processor 20, and is provided with user input interfaces having at least some user interface elements that can be selectively disabled. The user input interfaces can be provided using mechanical buttons, touch screen buttons, or many other types of user inputs, as described earlier in reference to user input interfaces block 30 of FIG. 1. When enabled, the user input interfaces permit a user of the digital image display device 10 to select between various modes of operation, and to control various features. For example, the user can select a particular display mode for displaying digital images on the display screen 40 from a plurality of available display modes. By disabling at least a portion of the user input interfaces block 30, a remote individual can ensure that the user of the digital image display device 10, who may be an elderly person or a person who is not technically savvy, does not inadvertently select an unwanted operating mode.

In receive digital images step 455, the central processor 20 communicates via the network interface block 34 to receive digital images and other digital media assets from the content and configuration server 110, as described earlier in reference to the obtain and store new content step 260 of FIG. 4B. The received digital media assets are stored in non-volatile storage block 22 or using a removable storage media connected to media interface block 32.

In receive control information step 460, the central processor 20 communicates via the network interface block 34 to receive user interface control information and other types of device configuration information from the content and configuration server 110, as described earlier in reference to the obtain configuration information step 265 of FIG. 4B. This user interface control information can include one or more display screen control parameters that were obtained from the web pages user interface block 124 as a result of selections made by a graphical user interface 60 having a remote individual using the display screen controls section 72 as shown in FIG. 6. In a preferred embodiment, the display screen control parameters include a parameter providing an indication of whether the user interface of the digital image display device 10 should be on (if the remote individual has selected the On option 74A), mostly off (if the remote individual has selected the Mostly Off option 74B), or entirely off (if the remote individual has selected the All Off option 74C). In some embodiments, the display screen control parameters can also include a message parameter entered in the message entry area 76 (e.g., "Call Larry for changes"), that can be displayed on the display screen 40 if the user of the digital image display device 10 attempts to activate one of the user input interfaces block 30 that has been disabled.

The control information received in the receive control information step 460 can also include display mode information such as the picture display duration selected by the remote individual using picture display duration section 94. In this example, the display modes include a slideshow display mode, and the display mode information received from the content and configuration server 110 includes information defining the predetermined period of time (e.g., 30 seconds) during which images are to be displayed during the slideshow mode.

A display screen controls test 465 is used to evaluate a received display screen control parameter setting, such as a parameter corresponding to the setting selected in the display screen controls section 72 of FIG. 6. If the display screen controls test 465 determines that the user interface of the digital image display device 10 should be on (e.g., if the remote individual has selected the On option 74A), then an enable user interface step 470 is executed that enables all of the user interface elements in the user input interfaces block 30 (FIG. 1).

If the display screen controls test 465 determines that the user interface of the digital image display device 10 should be mostly off (e.g., if the remote individual has selected the Mostly Off option 74B), then a partially disable user interface step 475 is executed that disables a portion of the user interface elements in the user input interfaces block 30. For example, any user interface elements that are used to control the display mode may be disabled, while the "forward" and "reverse" function buttons that were described with in relation to FIG. 1 may be enabled.

If the display screen controls test 465 determines that the user interface of the digital image display device 10 should be entirely off (e.g., if the remote individual has selected the All Off option 74C) then a disable user interface step 480 is executed that disables all of the user interface elements in the user input interfaces block 30.

In the partially disable user interface step 475 and the disable user interface step 480, the received user interface control information is used to selectively disable at least a portion of the user input interfaces block 30 of the digital image display device 10.

Finally, a display received images step 485 is used to display the received digital images on the display screen 40 with the user interface configured according to the received user interface control information. In the case where the user interface has been either fully or partially disabled, the disabled user interface elements will have no effect if they are activated by a user. In some embodiments, if the user of the digital image display device 10 attempts to activate one of the user interface elements that has been disabled, the central processor 20 displays an informational message on the display screen 40. The message can be a default message, such as "This button has been disabled", or the message can be one which was defined by the remote individual by entering a text string in the message entry area 76 (FIG. 6) and received by the digital image display device 10 over the network via the network interface block 34 in the receive control information step 460.

Figure 10:
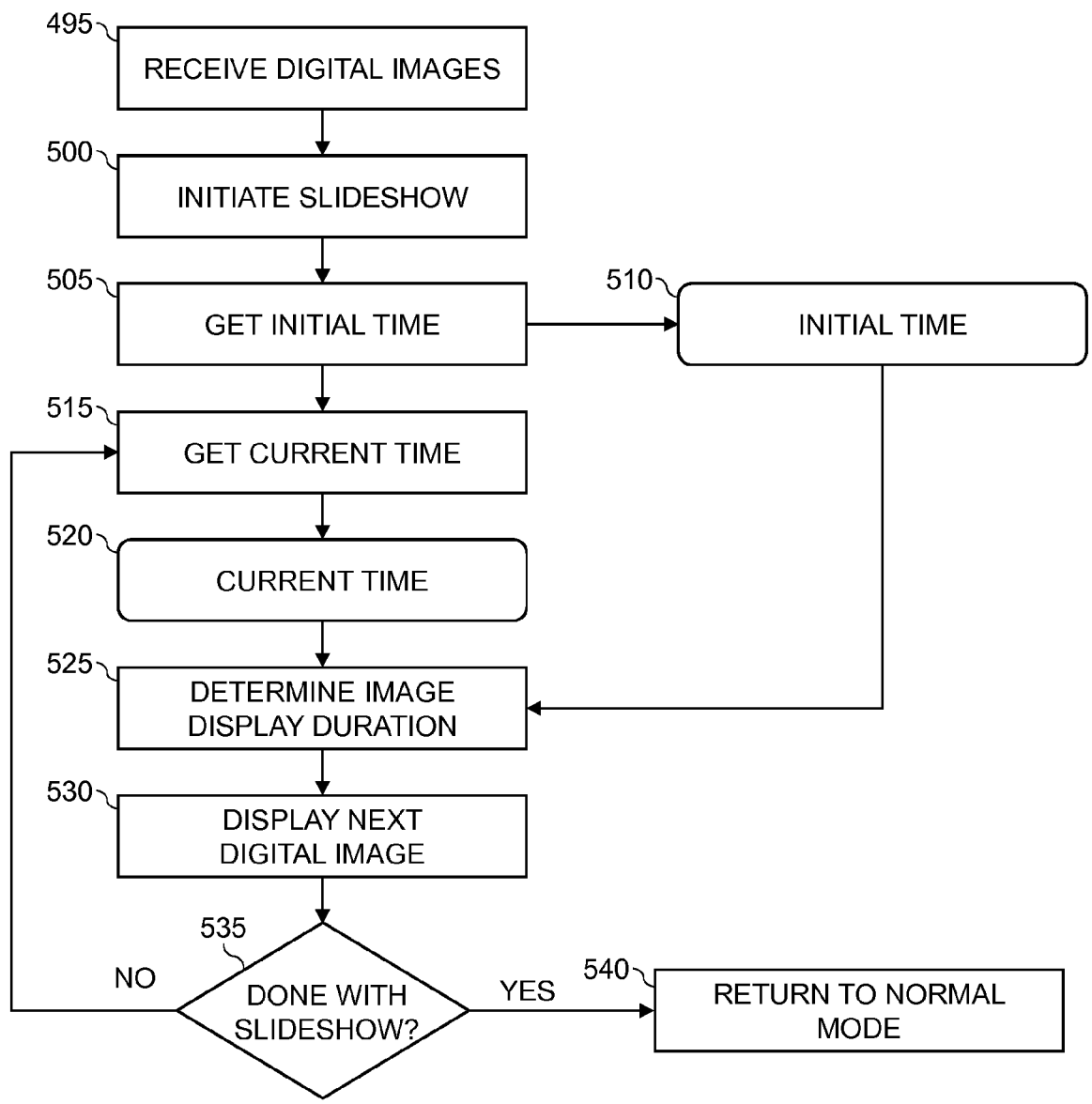
FIG. 10 is a flow diagram for providing a variable image display duration when displaying a sequence of digital images on a digital image display device.

FIG. 10 is a flow diagram of a method for providing a variable image display duration when automatically displaying a group of received digital images on the digital image display device 10. This is a particularly useful feature for viewing a newly received group of digital images, or other digital media assets, on the display screen 40 of the digital image display device 10. As discussed with reference to FIG. 1, the digital image display device 10 includes a real-time clock 21 providing the time of day, which can be used to enable a variable display duration according to a "smart display duration mode." In some embodiments, the user of the digital image display device 10, or a remote user configuring the device using a remote interface such as the graphical user interface 60 of FIG. 6, can choose whether the device should operate in a smart picture display duration mode or a fixed display duration mode. For example, the user interface elements in the picture display duration section 94 of FIG. 6 can be used to select a fixed display duration option 96 or a smart display duration option 98A or 98B. The remainder of the discussion of FIG. 10 will assume that the digital image display device 10 is set to operate in a smart display duration mode having a variable image display duration.

In receive digital images step 495, a group of digital images or other digital media assets are received and stored in non-volatile storage block 22 or using a removable storage media connected to media interface block 32. The digital media assets may be received via the network interface block 34 from the content and configuration server 110, or may be provided using a removable storage media or a local connection to a computer or another image capable device. In some embodiments, it can be desirable to play some sort of alert sound to provide notification to users in the vicinity of the digital image display device 10 that new digital images have been received and are available for viewing.

In initiate slideshow step 500, the central processor 20 initiates the display of a sequence of digital images or other digital media assets. In some embodiments, the initiate slideshow step 500 is performed automatically in response to receiving new digital images in receive digital images step 495. In some embodiments, the initiate slideshow step 500 can also be initiated using other methods, such as by activating various user interface elements. Preferably, the sequence of digital images includes at least a subset of the digital images received in receive digital images step 495. In some embodiments, the sequence of digital images includes only the newly received digital images. In other embodiments, the sequence of digital images can also include previously received digital images. For example, the newly received digital images can be included first at the beginning of the sequence of digital images, followed by some or all of the previously received digital images.

The sequence of digital images displayed on the display screen 40 will be displayed using a variable image display duration responsive to the time since the slideshow was initiated. A get initial time step 505 is used to determine an initial time 510 that the slideshow was initiated. An indication of the initial time 510 is stored in non-volatile storage block 22. In a preferred embodiment, the initial time 510 is determined by accessing a real-time clock 21 (FIG. 1) included in the digital image display device 10. In other embodiments, the initial time 510 can be determined according to a real-time clock located at a different network node that can be accessed using the network interface block 34.

In get current time step 515, the central processor 20 determines a current time 520. In a preferred embodiment, the current time 520 is determined by accessing the real-time clock 21 (FIG. 1) included in the digital image display device 10. In other embodiments, the current time 520 can be determined according to a real-time clock located at a different network node that can be accessed using the network interface block 34.

A determine image display duration step 525 determines an image display duration for the next digital image in the sequence of digital image. In a preferred embodiment, the image display duration is responsive to the current time 520 and the initial time 510. In some embodiments, the determine image display duration step 525 calculates an elapsed time since the slideshow was initiated by determining a difference between the current time 520 and the initial time 510. The image display duration is then determined responsive to the elapsed time. In one embodiment, if the elapsed time is less than a threshold time difference then a first short image display duration is used, and if the elapsed time is greater than the threshold time difference then a second long image display duration is used.

In some embodiments, the first short image display duration and the second long image display duration can be selected by the user of the digital image display device 10, using user input interfaces block 30, or by a remote individual using, for example, picture display duration section 94 described earlier in reference to FIG. 6. For example, the first short image display duration can be selected to be 10 seconds (by selecting smart display duration option 98A) or to be 30 seconds (by selecting smart display duration option 98B). Likewise, the second long image display duration can be selected to be 10 minutes (by selecting smart display duration option 98A) or to be 30 minutes (by selecting smart display duration option 98B).

The threshold time difference can be predefined (e.g., 10 minutes), or can be associated with the selected smart display duration option, or in some embodiments can be user selectable using user interface elements (not shown). In some embodiments, the image display duration may be changed gradually, or in steps, rather than changing it abruptly from the first short image display duration to the long image display duration. For example, the image display duration can be gradually increased by incrementing the image display duration to increasingly longer values as the elapsed time exceeds additional threshold time values (e.g., the image display duration can be increased to 3 minutes after 20 minutes has elapsed and 10 minutes after 1 hour has elapsed).

In some embodiments, rather than the image display duration being determined responsive to the elapsed time since the slideshow was initiated, it can be determined according to other factors. For example, a first short image display duration can be used the first time each of the digital images in the sequence of digital images is displayed. Then, a second longer image display duration can be used when the slideshow repeats the sequence of digital images.

In some embodiments, the image display duration for a particular image can be adjusted responsive to metadata, such as an importance rating, associated with the particular image. For example, if the importance metadata provides a "star" rating of between 1 and 5 stars, the display duration can be increased for images having higher "star" ratings. This may be accomplished, for example, by multiplying the current display duration by a factor equal to 0.5× for "1 star" rated images, 1× for "2 star" and "3 star" rated images, 2× for "4 star" rated images and 4× for "5 star" rated images. In addition, the importance rating can also be used to determine whether to eliminate low-rated images from a slideshow. For example, images that are rated "1 star" or "2 star" may be eliminated from the sequence when it is repeated multiple times with longer image display durations.

Once the image display duration has been determined by the determine image display duration step 525, the next digital image in the sequence of digital images is displayed using a display next received digital image step 530 according to the determined image display duration.

A done with slideshow test 535 is used to determine whether the slideshow should be terminated. If so, then a return to normal mode step 540 is used to return the digital image display device 10 to a normal operation state (e.g., the state that the device was in before the slideshow was initiated). Otherwise, the get current time step 515 is executed again to determine the image display duration for the next digital image. In some embodiments, the slideshow will play indefinitely until the user turns off the digital image display device 10, or until the digital image display device

10 is placed into a reduced power mode (e.g., according to the off time 82 specified in the display screen power mode section 78 of FIG. 6).

In some embodiments, if the digital image display device 10 receives digital images or other digital media assets over the network interface block 34, the central processor 20 automatically executes the initiate slideshow step 500 and the get initial time step 505 to reset the initial time 510, so that the newly received digital media assets can be viewed by the user in a relatively rapid sequence. In embodiments where the digital image display device 10 includes a power control circuit for enabling an active display mode for displaying digital images on the display screen 40 and a reduced power mode wherein the display screen 40 does not display digital images, as described earlier in reference to FIG. 8, the central processor 20 can automatically set the display mode to the active display mode when new digital media assets are received from the network, and can then initiate the display of a slideshow according to the method of FIG. 10.

It will be understood that the digital images and metadata can be provided to the digital image display device 10 using configurations other that the one depicted in FIG. 3. For example, a personal computer connected to the Internet can be used to obtain digital images and metadata from a variety of individuals. The digital images and metadata can be provided, for example, by email server 140 or content providing systems 150. The digital images and metadata can then be stored on a removable storage device, such as a SD memory card or a USB jump drive. The removable storage device can then be removed from the personal computer and connected to the media interface block 32 of the digital image display device 10. The digital images and metadata can then be transferred, under the control of central processor 20, from the removable storage device to the non-volatile storage block 22.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain exemplary embodiments thereof. It will, however, be understood that variations and modifications can be effected within the spirit and scope of the invention. The present specification and figures are accordingly to be regarded as illustrative rather than restrictive.

PARTS LIST

10 digital image display device
20 central processor
21 real-time clock
22 non-volatile storage block
24 buffer memory block
30 user input interfaces block
31 user buttons
32 media interface block
33 interface connectors
34 network interface block
40 display screen
42 display compensation block
44 speaker(s)
46 audio codec block
50 power supply
52 frame surround
54 sliders
60 graphical user interface
61 unique identifier entry section
62 activation code
63 account creation section
64 name
65A account name
65B account password
66 content selection entry section
68 E-mail address portion
70A icon
70B icon
70C icon
72 display screen controls section
74A option
74B option
74C option
76 message entry area
78 display screen power mode section
80 on time
82 off time
84A option
84B option
86 remote viewing interface section
88 digital media asset
90 metadata
92 display mode and picture management section
93A option
93B option
93C option
93D option
93E option
94 picture display duration section
96 fixed display duration option
98A smart display duration option
98B smart display duration option
102 routing server
104 action logging server
106 authentication server
110 content and configuration server
120 web page server
122 administration configuration interface
124 web pages user interface
130 digital image and metadata content storage
140 E-mail server
150 content providing systems
152 external content media server
154 external content host
156 external digital image and metadata content
200 obtain list of digital media assets step
205 read next digital media asset step
210 decompress data step
215 resize image for display step
220 compensate image data for display step
225 display image step
230 respond to user interface inputs step
235 wait to display next digital media asset step
250 identify server(s) step
255 obtain security code token step
260 obtain and store new content step
265 obtain configuration information step
300 provide unique device identifier step
305 supply content step 310 detect device connection step
315 transfer content to device step
355 provide remote interface step
360 transfer images step
365 display image locally step
370 display image remotely step
405 receive digital images step
410 store received digital images step
415 power mode test
420 set active display mode step
425 display received images step
455 receive digital images step
460 receive control information step
465 display screen controls test
470 enable user interface step
475 partially disable user interface step
480 disable user interface step
485 display received images step
495 receive digital images step
500 initiate slideshow step
505 get initial time step
510 initial time
515 get current time step
520 current time
525 determine image display duration step
530 display next received digital image step
535 done with slideshow test
540 return to normal mode step

The invention claimed is:

1. A digital image display device for displaying a collection of digital images, comprising:
   a display screen;
   a processor;
   a real-time clock;
   an image memory for storing a plurality of digital images; and
   a processor-accessible program memory storing executable instructions for causing the processor to execute the steps of:
   initiating a sequential display of a sequence of digital images on the display screen at an initial time, wherein the initial time is the time at which a first image of a plurality of images in the sequence of digital images is displayed, the sequence of digital images including at least a subset of the stored digital images, each digital image being displayed for an image display duration, the image display duration for each image in the sequence of digital images being set to an initial image display duration at the initial time;
   modifying the image display duration during the display of the sequence of digital images responsive to an elapsed time, the elapsed time corresponding to the difference between the initial time and a current time as determined from the real-time clock; and
   for a particular digital image, modifying the particular digital image display duration responsive to metadata associated with the particular digital image, wherein the metadata provides a plurality of importance ratings for the particular digital image including at least a low importance level, an intermediate importance level, and a high importance level.

2. The digital image display device of claim 1 wherein the image display duration is increased from the initial image display duration to a longer image display duration when the elapsed time exceeds a threshold value.

3. The digital image display device of claim 1 wherein the image display duration is incrementally increased from the initial image display duration to increasingly longer image display durations, each incremental increase in the display duration occurring in response to the elapsed time exceeding corresponding threshold values.

4. The digital image display device of claim 1 wherein the sequence of digital images is displayed repeatedly, and wherein the image display duration is further modified responsive to the number of times that the complete sequence of digital images has been displayed.

5. The digital image display device of claim 4 wherein the image display duration is increased from the initial image display duration to a longer image display duration after the complete sequence of digital images has been displayed once.

6. The digital image display device of claim 1 further comprising a user interface adapted to enable a user to select the initial image display duration.

7. The digital image display device of claim 1 further including a network interface for communicating with a network, and wherein the initial image display duration is set in response to information received using the network interface.

8. The digital image display device of claim 1 further comprising a user interface adapted to enable the user to initiate the sequential display of the sequence of digital images.

9. The digital image display device of claim 1 further including a network interface for communicating with a network, and wherein the display of the sequence of digital images is initiated when one or more new digital images are received from a network server using the network interface, the sequence of digital images including the received new digital images.

10. The digital image display device of claim 9 wherein the sequence of digital images includes only the received new digital images.

11. The digital image display device of claim 9 wherein the sequence of digital images includes the received new digital images together with at least some previously received digital images.

12. The digital image display device of claim 9 further comprising a power control circuit for enabling an active display mode wherein digital images are displayed on the display screen, and for enabling a reduced power mode wherein the display screen does not display digital images, and wherein the processor sets the power control circuit to operate in the active display mode when the new digital images are received from the network server.

13. The digital image display device of claim 12 wherein if the power control circuit is initially operating in the reduced power mode when the new digital images are received from the network server, it is returned to the reduced power mode after the sequential display of the sequence of digital images is terminated.

14. The digital image display device of claim 1 wherein the sequential display of the sequence of digital images is terminated when an elapsed time exceeds a predefined threshold value.

15. The digital image display device of claim 1 wherein the sequential display of the sequence of digital images is terminated when the complete sequence of digital images has been displayed a predefined number of times.

16. The digital image display device of claim 1 wherein the particular image display duration is modified to be a larger value when the importance rating indicates that the particular digital image has the high importance level.

17. The digital image display device of claim 1 wherein the particular image display duration is modified to be a shorter value when the importance rating indicates that the particular digital image has the low importance level.

18. The digital image display device of claim 1 wherein the metadata provides at least an additional intermediate importance level.

* * * * *